United States Patent
Keaton et al.

(10) Patent No.: US 7,289,662 B2
(45) Date of Patent: Oct. 30, 2007

(54) METHOD AND APPARATUS FOR APPARATUS FOR GENERATING THREE-DIMENSIONAL MODELS FROM UNCALIBRATED VIEWS

(75) Inventors: Patricia Keaton, Woodland Hills, CA (US); Amit K. Roy Chowdry, Hyattsville, MD (US)

(73) Assignee: HRL Laboratories, LLC, Malibu, CA (US)

(\*) Notice: Subject to any disclaimer, the term of this patent is extended or adjusted under 35 U.S.C. 154(b) by 807 days.

(21) Appl. No.: 10/730,789

(22) Filed: Dec. 8, 2003
(Under 37 CFR 1.47)

(65) Prior Publication Data
US 2004/0258309 A1    Dec. 23, 2004

Related U.S. Application Data

(60) Provisional application No. 60/431,701, filed on Dec. 7, 2002.

(51) Int. Cl.
 *G06K 9/00* (2006.01)
 *G06T 15/00* (2006.01)

(52) U.S. Cl. ................ 382/154; 345/419; 356/12; 348/42; 359/462

(58) Field of Classification Search ............ 382/154, 382/285; 345/419–427; 356/12–14; 348/42–60; 359/462–477
See application file for complete search history.

(56) References Cited

U.S. PATENT DOCUMENTS

| | | | | |
|---|---|---|---|---|
| 6,009,190 A | * | 12/1999 | Szeliski et al. | 382/154 |
| 6,157,747 A | * | 12/2000 | Szeliski et al. | 382/284 |
| 6,256,036 B1 | * | 7/2001 | Matsumoto | 345/419 |
| 6,393,163 B1 | * | 5/2002 | Burt et al. | 382/294 |
| 6,396,491 B2 | * | 5/2002 | Watanabe et al. | 345/419 |
| 6,819,318 B1 | * | 11/2004 | Geng | 345/420 |
| 2005/0088435 A1 | * | 4/2005 | Geng | 345/419 |
| 2005/0089213 A1 | * | 4/2005 | Geng | 382/154 |
| 2007/0024611 A1 | * | 2/2007 | Ingram | 345/419 |

OTHER PUBLICATIONS

P. Beardsley, P. Torr, A. Zisserman, "3D model acquisition from extended image sequences," in ECCV, Cambridge UK, 1996, pp. 683-695.

(Continued)

*Primary Examiner*—Bhavesh M Mehta
*Assistant Examiner*—Aaron W Carter
(74) *Attorney, Agent, or Firm*—Tope-McKay & Assoc.

(57) ABSTRACT

A system for generating three-dimensional models from still imagery or video streams from uncalibrated views, is presented. The system comprises a computer system including a processor, a memory coupled with the processor, an input coupled with the processor for receiving imagery captured from multiple pan-tilt settings of an uncalibrated image capturing device, and an output coupled with the processor for outputting an overall three-dimensional model of a complex scene containing rigid and non-rigid objects. The computer system includes a method for forming a three-dimensional model from uncalibrated views of an object, and a method for automatically stitching together three-dimensional models extracted from uncalibrated views of uncalibrated image capturing device locations, without the need of manual "image registration" of "points in common" between the models. Furthermore, the system uses the object's prior shape information to generate a robust matching scheme that supports the detection of missing features and occlusions between views.

84 Claims, 15 Drawing Sheets

OTHER PUBLICATIONS

R. Koch, et al., "Multi viewpoint stereo from uncalibrated sequences," ECCV, Freiburg, DE, 1998, pp. 55-71.

B.C. Vemuri, J.K. Aggarwal, "3d model construction from multiple views using range and intensity data," IEEE CVPR, Miami Beach, 1986, pp. 435-437.

J. Vanden Wyngaerd, L. VanGool, R. Koch, and M. Proesmans, "Invariant-based registration of surface patches," in ICCV99, 1999, pp. 301-306.

P.J. Besl and N.D. McKay, "A method for registration of 3-d shapes," PAMI, vol. 14, No. 2, pp. 239-256, Feb. 1992.

P.A. Viola and W.M. Wells, III, "Alignment by maximization of mutual information," IJCV, vol. 24, No. 2, pp. 137-154, Sep. 1997.

M.C. Burl, M. Weber, and P. Perona, "A probabilistic approach to object recognition using local photometry and global geometry," in ECCV98, 1998.

R. Sinkhorn, "A relationship between arbitrary positive matrices and doubly stochastic matrices," Annals Math. Stat. vol. 35, pp. 876-879, 1964.

A. W. Fitzgibbon, "Robust registration of 2D and 3D point sets," in British Machine Vision Conference, 2001, pp. 662-670.

G. Blais, et al., "Registering multiview range data to create 3D computer objects," IEEE TPAMI, vol. 17, pp. 820-824, Aug. 1995.

C. Schmid, R. Mohr, and C. Bauckhage, "Comparing and evaluating interest points," in International Conference on Computer Vision, 1998, pp. 230-235.

C. Tomasi and J. Shi, "Good features to track," in IEEE Computer Vision and Pattern Recognition, 1994, pp. 593-600.

T.J. Cham, et al., "A statistical framework for long-range feature matching in uncalibrated image mosaicing," IEEE CVPR, 1998, pp. 442-447.

F. Badra, A. Qumsieh, and G. Dudek, "Robust mosaicing using Zernike moments," PRAI, vol. 13, No. 5, pp. 685-704, Aug. 1999.

N. Ritter, et al., "Registration of stereo and temporal images of the retina," IEEE Trans. on Med. Imag., vol. 18, No. 5, pp. 404-418, May 1999.

R. Duda and P. Hart, Pattern Classification and Scene Analysis, John Wiley and Sons, 1973, pp. 211-221.

M.D. Srinath, P.K. Rajasekaran, and R. Viswanathan, Introduction to Statistical Signal Processing with Applications, Prentice Hall, 1996, pp. 33-46.

* cited by examiner

The features identified in the front view image 400 and the side view image 402 which the embodiment seeks to match.

The intensity blocks around the features to be matched in the front view. The small numbers place above each intensity block represent the spatial position of the corresponding feature in the image.

The intensity blocks around the features to be matched in the side view. The small numbers place above each intensity block represent the spatial position of the corresponding feature in the image.

The shape of the significant image attributes in the front view around the previous feature points extracted. The small numbers place above each intensity block represent the spatial position of the corresponding feature in the image.

The shape of the significant image attributes in the side view around the previous feature points extracted. The small numbers place above each intensity block represent the spatial position of the corresponding feature in the image.

The prior information (i.e., the shape representation averaged over a large number of viewing angles), which was computed before applying the embodiment of the invention.

The posterior probability matrix P(X,Y) prior to the Sinkhorn normalization procedure.

The a posteriori probabilities for each of the features in the front image, obtained from each of the rows of the correspondence matrix.

The a posteriori probabilities for each of the features in the front image, obtained from each of the columns of the correspondence matrix.

The probability of matching X against all permutations of Y. The true value is marked with 1302, an arrow below the horizontal axis.

The probability of match for the shape of each feature in the front image against all possible combinations of the features in the side view, for the case where prior information is not available. The true value is marked with 1402, an arrow below the horizontal axis.

1500 and 1502 are the 3D models used as input to the algorithm. 1504 and 1506 are the 3D models obtained after the alignment.

METHOD AND APPARATUS FOR APPARATUS FOR GENERATING THREE-DIMENSIONAL MODELS FROM UNCALIBRATED VIEWS

PRIORITY CLAIM

This application claims the benefit of priority to provisional application No. 60/431,701, filed in the United States on Dec. 7, 2002, and titled "Method and Apparatus for Generating Three-Dimensional Models from Uncalibrated Views."

BACKGROUND

1. Technical Field

The present invention relates to the fields of image processing, feature recognition within images, image analysis, and computer vision. More specifically, the present invention pertains to a method and apparatus for generating three-dimensional models from still imagery or video streams from uncalibrated views.

2. Discussion

The problem of generating three-dimensional (3D) shapes using a set of two-dimensional (2D) images has been addressed to-date by several different techniques. A summary of the more noteworthy of these techniques is presented here. The first several techniques provide background information regarding the registration of 3D image portions to generate 3D shapes, and the subsequent techniques discuss the problem of generating 3D shapes from a set of 2D images.

One of the best-known methods for registration is the iterative closest point (ICP) algorithm of Besl and McKay. It uses a mean-square distance metric which converges monotonically to the nearest local minimum. The ICP algorithm is used for registering 3D shapes by considering the full six degrees of freedom in a set of motion parameters. It has been extended to include the Levenberg-Marquardt non-linear optimization and robust estimation techniques to minimize the registration error.

Another well-known method for registering 3D shapes is the work of Vermuri and Aggarwal where range and intensity data are used for reconstructing complete 3D models from partial ones. Registering range data for the purpose of building surface models of three-dimensional objects was also the focus of the work by Vermuri and Aggarwal entitled "Registering multiview range data to create 3D computer objects," cited below. Matching image tokens across triplets, rather than pairs, of images has also been considered. In "3D model acquisition from extended image sequences," cited below, the authors developed a robust estimator for a trifocal tensor based upon corresponding tokens across an image triplet. This was then used to recover a 3D structure. Reconstructing a 3D structure has also been considered using stereo image pairs from an uncalibrated video sequence. Most of these algorithms work well given good initial conditions (e.g. for 3D model alignment, the partial models have to be brought into approximate positions). The problem of automatic "crude" registration (in order to obtain good initial conditions) was addressed in "Invariant-based registration of surface patches," cited below, where the authors used bitangent curve pairs which could be found and matched efficiently.

In the above methods, geometric properties are used to align 3D shapes. Another important area of interest for registration schemes is 2D image matching, which can be used for applications such as image mosaicing, retrieval from a database, medical imaging etc. 2D matching methods generally rely on extracting features or interest points. In "Comparing and evaluating interest points," cited below, the authors demonstrate that interest points are stable under different geometric transformations and define their quality based on repeatability rate and information content. One of the most widely used schemes for tracking feature points is the KLT tracker, which combines feature selection and tracking across a sequence of images by minimizing the sum of squared intensity differences over windows in two frames. A probabilistic technique for feature matching in a multi-resolution Bayesian framework was developed and used in uncalibrated image mosaicing. A further approach involves the use of Zernike orthogonal polynomials to compute the relative rigid transformations between images. It allows the recovery of rotational and scaling parameters without the need for extensive correlation and search algorithms. Although, these techniques are somewhat effective, precise registration algorithms are required for applications such as medical imaging. A mutual information criterion, optimized using the simulated annealing technique, has been used to provide the precision necessary for aligning images of the retina.

Most of the state of the art techniques developed to date, as in the case of all the methods above, cannot stitch together two distinct 3D models of a scene or an object without having the 3D models approximately registered before attempting to perform 3D model alignment. In order to approximately register the 3D models, most of the prior art manually picks several points in common between the two 3D models to be stitched together by having a user clicking on "points in common" on both of the 3D models, with a computer mouse. Then the prior art uses these manually registered "points in common" on both of the 3D models to crudely align the models together, then proceeds to match the features extracted from the 3D models and uses the new matching features to morph one 3D model into the other 3D model eventually refining the initial crude alignment, and thus finally stitching the 3D models together.

In an attempt to avoid the manual registration of "points in common" between the two 3D models to be stitched together, various probabilistic schemes have also been used for registration problems. One of the most well-known techniques is the work of Viola and Wells for aligning 2D and 3D objects by maximizing mutual information. The technique is robust with respect to the surface properties of objects and illumination changes. A stochastic optimization procedure was proposed for maximizing the mutual information. A probabilistic technique for matching the spatial arrangement of features using shape statistics was also proposed in "A probabilistic approach to object recognition using local photometry and global geometry," cited below. Most of these techniques in image registration work for rigid objects. However, constraints using intensity and shape usually break down for non-rigid objects, such as human faces.

Therefore, most of the state of the art techniques developed to date cannot stitch together two distinct 3D models of a scene or an object without having the 3D models approximately registered before attempting to perform 3D model alignment (i.e. good initial conditions). Furthermore, the methods trying to fix the problem of automatic "image registration" break down when attempting to align 3D models generated for non-rigid objects such as human faces. Thus, artisans are faced with the problem of choosing between 3D stitching algorithms that works for non-rigid objects but required manual "image registration" of "points in common" between the models, or choosing a 3D stitching algorithm that only works for rigid objects but does not required the manual "image registration" of the models.

In addition, the problem of automatic "image registration" increases greatly by obtaining 3D models extracted from uncalibrated image capturing devices, where the user does not have information concerning the location of an uncalibrated image capturing device with respect to the object of interest, and with respect to the location of any of the other uncalibrated image capturing devices generating the other 3D models to be stitched together.

A need exists in the art for a technique that does not require the manual "image registration" of "points in common" between the models prior to stitching them together. Instead, it would be desirable to automatically establish a global correspondence between two 3D models (or two 2D models) by minimizing the probability of error of a match between the entire constellation of features extracted from the models, thus taking into account the global spatial configuration of the features for each of the models. Furthermore, it would be desirable for the technique to work with both rigid and non-rigid types of objects as well as for complex scenes containing both rigid and non-rigid objects captured from multiple uncalibrated image capturing device locations.

While most of the state of the art techniques developed to date employ a local matching strategy that only establishes correspondence between the individual features within a local region in a model, it would be more desirable to employ a "global" matching strategy, thus emphasizing the "structural description" of a scene or an object within the model. In addition, the embodiment uses the object's prior shape information to generate a robust matching scheme which supports the detection of missing features and occlusions between views.

Thus, there is a great need in the art for a system for generating three-dimensional models from still imagery or video streams from uncalibrated views captured from an uncalibrated image capturing device location, where the system stitches together the three-dimensional models viewed from a subset of the uncalibrated image capturing device locations with out the need of manual "image registration" of "points in common" between the models, and wherein the system works for both rigid and non-rigid objects.

The following references are presented for further background information:

[1] P. Beardsley, P. Torr, and A. Zisserman, "3D model acquisition from extended image sequences," in *European Conference on Computer Vision*, Cambridge, UK, 1996, pp. 683-695.

[2] R. Koch, M. Pollefeys, and L. Van Gool, "Multi viewpoint stereo from uncalibrated sequences," in *European Conference on Computer Vision*, Freiburg, Germany, 1998, pp. 55-71.

[3] B. C. Vemuri and J. K. Aggarwal, "3d model construction from multiple views using range and intensity data," in *IEEE Computer Vision and Pattern Recognition*, Miami Beach, 1986, pp. 435-437.

[4] J. Vanden Wyngaerd, L. VanGool, R. Koch, and M. Proesmans, "Invariant-based registration of surface patches," in *ICCV99*, 1999, pp. 301-306.

[5] P. J. Besl and N. D. McKay, "A method for registration of 3-d shapes," *PAMI*, vol. 14, no. 2, pp. 239-256, February 1992.

[6] P. A. Viola and W. M. Wells, III, "Alignment by maximization of mutual information," *IJCV*, vol. 24, no. 2, pp. 137-154, September 1997.

[7] M. C. Burl, M. Weber, and P. Perona, "A probabilistic approach to object recognition using local photometry and global geometry," in *ECCV98*, 1998.

[8] R. Sinkhorn, "A relationship between arbitrary positive matrices and doubly stochastic matrices," *Annals Math. Statist.* vol. 35, pp. 876-879, 1964.

[9] M. D. Srinath, P. K. Rajasekaran, and R. Viswanathan, *Introduction to Statistical Signal Processing with Applications*, Prentice Hall, 1996.

[10] R. Duda and P. Hart, *Pattern Classification and Scene Analysis*, John Wiley and Sons, 1973.

[11] A. W. Fitzgibbon, "Robust registration of 2D and 3D point sets," in *British Machine Vision Conference*, 2001, pp. 662-670.

[12] G. Blais and M. D. Levine, "Registering multiview range data to create 3D computer objects," *IEEE Trans. on Pattern Analysis and Machine Intelligence*, vol. 17, pp. 820-824, AUGUST 1995.

[13] C. Schmid, R. Mohr, and C. Bauckhage, "Comparing and evaluating interest points," in *International Conference on Computer Vision*, 1998, pp. 230-235.

[14] C. Tomasi and J. Shi, "Good features to track," in *IEEE Computer Vision and Pattern Recognition*, 1994, pp. 593-600.

[15] T. J. Cham and R. Cipolla, "A statistical framework for long-range feature matching in uncalibrated image mosaicing," in *IEEE Computer Vision and Pattern Recognition*, 1998, pp. 442-447.

[16] F. Badra, A. Qumsieh, and G. Dudek, "Robust mosaicing using Zernike moments," *PRAI*, vol. 13, no. 5, pp.I 685, August 1999.

[17] N. Ritter, R. Owens, J. Cooper, R H. Eikelboom, and P. P. Van Saarloos, "Registration of stereo and temporal images of the retina," *IEEE Trans. on Medical Imaging*, vol. 18, no. 5, pp. 404-418, May 1999.

SUMMARY

The present invention teaches a technique for generating three-dimensional models from uncalibrated views. The technique can be operated as a method using general purpose computer and appropriate hardware, as an apparatus incorporated into a general purpose computer (typically in the form of software running on the computer), and as a computer program product having computer instructions stored on a computer-readable medium. The operations described for each aspect of the invention may be operated from any of these perspectives.

In one aspect, the operations of the present invention involve forming a three-dimensional model of at least a portion of a scene viewed from an uncalibrated image capturing device location. This operation is performed by receiving images from uncalibrated views of the uncalibrated image capturing device location. Once the images are received, features are extracted from the images from uncalibrated views of the uncalibrated image capturing device location. Next, correspondence is computed between features from images from the uncalibrated views captured from the uncalibrated image capturing device location. Next, a three-dimensional structure is formed, modeling at least a portion of a scene viewed from the uncalibrated image capturing device location. The act of forming a three-dimensional model viewed from an uncalibrated image capturing device location, for a subset of the uncalibrated image capturing device locations available, is then iterated.

After the iterations are complete, the three-dimensional models are stitched together from the subset of the uncalibrated image capturing device locations by the following operations. First, local persistent feature groupings are sought from the uncalibrated views captured at an uncalibrated image capturing device location. Then, the act of finding spatially local persistent feature groupings for a subset of the uncalibrated image capturing device locations available is iteratively performed. Next, correspondence between sets of feature groupings from two uncalibrated image capturing device locations for a subset of pair-wise combinations of uncalibrated image capturing device locations is computed. Subsequently, a search is performed for best matches, whereby multiple three-dimensional models from a subset of uncalibrated image capturing device locations are thus "stitched" together to form an overall three-dimensional model of at least a portion of a scene. Finally, the overall three-dimensional model of at least a portion of a scene is output.

In another aspect, in the operation of receiving images from uncalibrated views, the images are obtained using at least one uncalibrated image capturing device selected from a group consisting of a still camera, a video camera, a Magnetic Resonance Imaging (MRI) recording mechanism, an ultrasound recording apparatus. Furthermore, the imaging recording media used to gather snapshots of a desired portion of a scene at multiple uncalibrated views, is selected from a group consisting of a Compact Disk (CD), a Digital Versatile Disk/Digital Video Disk (DVD), a floppy disk, a removable hard drive, a digital camera, a video cassette, an Magnetic Resonance Imaging (MRI) recording media, an ultrasound recording media, and a solid-state recording media.

In a further aspect, the images from uncalibrated views are generated from a group consisting of: images generated by a single uncalibrated image capturing device viewing at least a portion of a scene at multiple pan and tilt settings; images captured with multiple uncalibrated image capturing devices viewing at least a portion of a scene; and images generated by multiple uncalibrated image capturing devices viewing at least a portion of a scene at multiple pan and tilt settings.

In a still further aspect, a portion of a scene comprises at least one object, and the images from uncalibrated views are formed from a group consisting of: images containing overlapping views of a portion of a scene, images containing partially overlapping views of a portion of a scene, images containing slightly overlapping views of a portion of a scene, and images containing non-overlapping views of a portion of a scene.

In another aspect, a further operation is performed for identifying and eliminating unpaired features prior to computing correspondence between features and computing correspondence between sets of feature groupings.

In yet another aspect, in the operation of extracting features from the images, the features include at least one of: corner features, high entropy points, local edge features, and contour features.

In a further aspect, the correspondence between features and the correspondence between sets of feature groupings are computed by using a technique selected from a group consisting of: probabilistic matching, correlation measure, chi-square statistical measure, and dot product of feature vectors.

In a still further aspect, in the operation of forming a three-dimensional structure from the uncalibrated image capturing device location, the three-dimensional structure is formed by a "structure from motion" algorithm. Where motion from the uncalibrated image capturing device is computed from the correspondence established from the images of uncalibrated views captured at different pan-tilt settings of the uncalibrated image capturing device location and where the "structure from motion" algorithm simulates a three-dimensional structure, modeling at least a portion of a scene from the motion of the uncalibrated image capturing device.

In a yet further aspect, the correspondence between features and the correspondence between sets of feature groupings are computed using a probabilistic matching method. Where the probabilistic matching method computes probabilities of match between features by using prior information representing a portion of a scene and where the probabilities of match between features correspond to a posteriori probabilities.

In still another aspect, in the operation of identifying and eliminating unpaired features, two unpaired features are identified by computing and plotting an a posteriori probability relating both features, wherein the a posteriori probability relating both features has a flat profile when the two features are unpaired.

In an additional aspect, the a posteriori probabilities are used to form a correspondence matrix, where a one-to-one correspondence between feature groupings from two uncalibrated image capturing device locations is established by maximizing the correspondence matrix.

In yet another additional aspect, a Sinkhorn normalization process is used to form the correspondence matrix.

In a still further aspect, in the operation of searching for the best matches, a Ransac robust estimation algorithm is used to find peaks on the correspondence matrix, wherein the peaks on the correspondence matrix indicate where the three-dimensional models from the uncalibrated image capturing device locations are to be stitched together.

In a different aspect, the a posteriori probability, $P(H_i|X)$, is defined by $$P(H_i \mid X) = \sum_{k=1}^{K} P(H_i \mid X, \xi_{X,\mu_k}) P(\xi_{X,\mu_j} \mid X = X_n)$$

where:
  $X=[X_1, \ldots, X_N]$ and $Y=[Y_1, \ldots, Y_M]$ denote two sets of features extracted from two images from uncalibrated views; wherein a total of N features was extracted from an uncalibrated view, and a total of M features was extracted from another uncalibrated view;
  $\mu=\mu_1, \ldots \mu_K$ represent a set of features extracted from prior information, wherein a total of K features was extracted from prior information of the portion of the scene;
  $H_i$ denotes a hypothesis that a feature $Y_i$ matches the set of features X, wherein i is a variable index with an integer value between 1 and M, and wherein i denotes an $i^{th}$ feature within the set of features Y;
  $\xi_{X,\mu_j}$ denotes an event that $\{X$ matches $\mu_j\}$, wherein j is a variable index with an integer value between 1 and K, and wherein j denotes a $j^{th}$ feature within the set of prior features $\mu$;

$P(\xi_{X,\mu_j}|X=X_n)$ denotes a probability of the set of features X matching a prior information feature $\mu_j$ given that the set of features X consists of a feature $X_n$, wherein n is a variable index with an integer value chosen between 1 and N, and wherein n denotes an $n^{th}$ feature within the set of features X;

$P(H_i|X,\xi_{X,\mu_j})$ denotes a probability of a feature $Y_i$ matching the set of features X given an event $\xi_{X,\mu_j}$ occurred (i.e. the set of features X matches the prior information feature $\mu_j$); wherein i denotes the $i^{th}$ feature within the set of features Y and j denotes the $j^{th}$ feature within the set of prior features $\mu$;

and wherein the probability of the set of features X matching the prior information feature $\mu_j$, $P(\xi_{X,\mu_j})$, and the probability of a feature $Y_i$ matching the set of features X given an event $\xi_{X,\mu_j}$ occurred, $P(H_i|X,\xi_{X,\mu_j})$, are defined by $$P(\xi_{X,\mu_j} | X = X_n) = \frac{1}{\sum_{k=1}^{K} <X_n, \mu_k>} <X_n, \mu_j>$$

and $$P(H_i | X, \xi_{X,\mu_j}) = \frac{1}{\sum_{k=1}^{K} E<Y_i, \mu_k>} <Y_i, \mu_j>$$

where

E denotes a probabilistic expectation measure, and <, > denotes an inner product, where the inner product represents a measure of similarity.

In another aspect, in the operation of outputting the overall three-dimensional model, the outputting device is selected from a group consisting of at least one of: a computer monitor, a video camera connected to a computer, and a computer readable media used to display the overall three-dimensional model of a portion of a scene, the computer readable media selected from a group consisting of an imaging Compact Disk (CD), a Digital Versatile Disk/Digital Video Disk (DVD), a floppy disk, a removable hard drive, a video cassette, and a solid-state recording media.

The features of the above embodiments may be combined in many ways to produce a great variety of specific embodiments, as will be appreciated by those skilled in the art. Furthermore, the means which comprise the apparatus are analogous to the means present in computer program product embodiments and to the acts in the method embodiment.

BRIEF DESCRIPTION OF THE DRAWINGS

The objects, features, aspects, and advantages of the present invention will become clearer from the following detailed descriptions of one embodiment of the invention in conjunction with reference to the appended claims, and accompanying drawings where:

DETAILED DESCRIPTION

Figure 1:
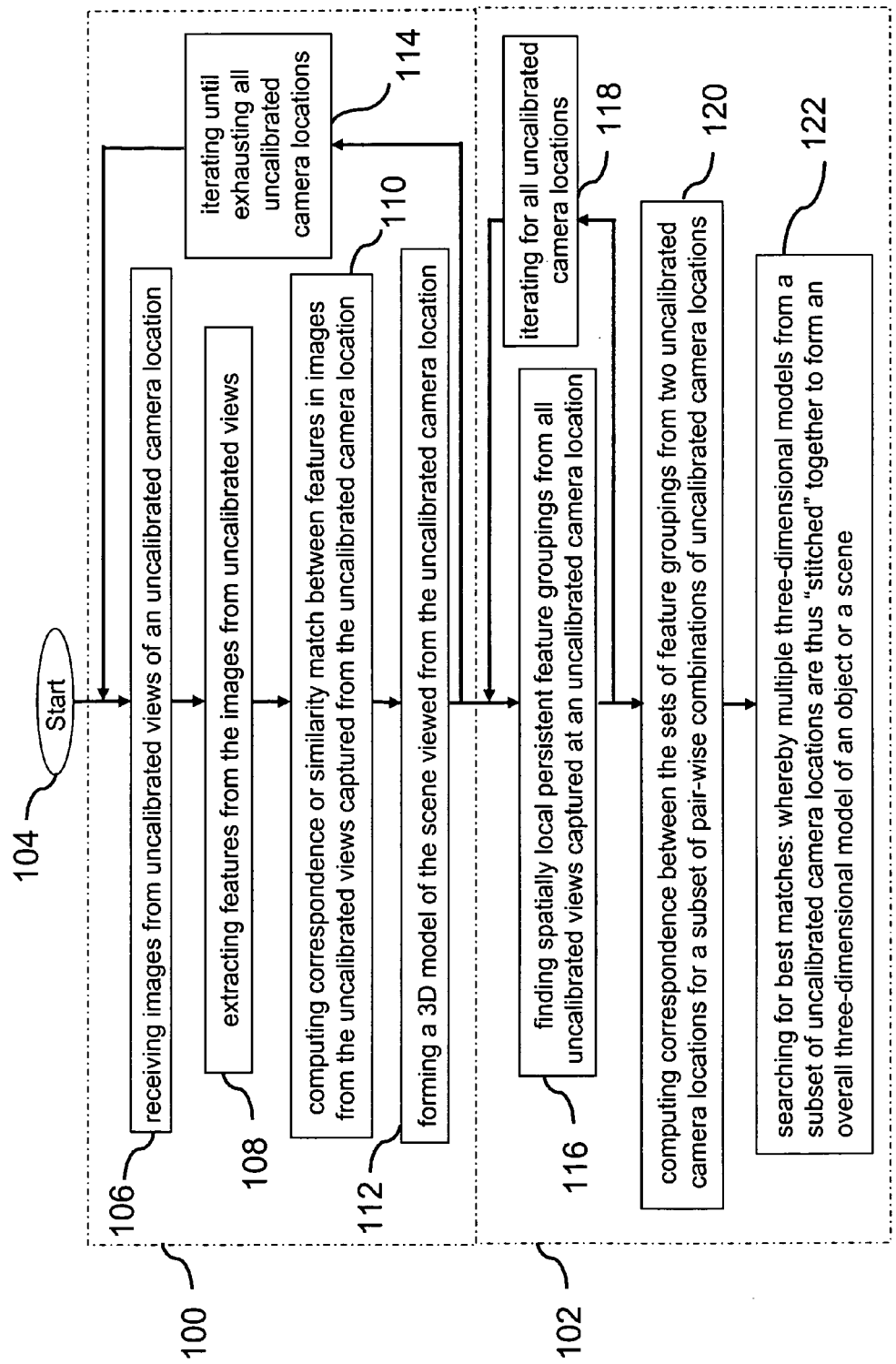
FIG. 1 is a flow chart depicting the operating acts/means/modules of the present invention.

The present invention relates to the fields of image processing, feature recognition within images, image analysis, and computer vision. More specifically, the present invention pertains to a method and apparatus for generating three-dimensional models from still imagery or video streams from uncalibrated views. The following description, taken in conjunction with the referenced drawings, is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore, it should be noted that, unless explicitly stated otherwise, the figures included herein are illustrated diagrammatically and without any specific scale, as they are provided as qualitative illustrations of the concept of the present invention.

In order to provide a working frame of reference, first a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Next, a brief introduction is provided in the form of a narrative description of the present invention to give a conceptual understanding prior to developing the specific details. Finally, a detailed description of the elements is provided in order to enable the reader to make and use the various embodiments of the invention without involving extensive experimentation.

(1) Glossary

Before describing the specific details of the present invention, it is useful to provide a centralized location for various terms used herein and in the claims. A definition has been included for these various terms. However, the definition provided should not be considered limiting to the extent that the terms are known in the art. These definitions are provided to assist in the understanding of the present invention.

Computer readable media—The term "computer readable media," as used herein, denotes any media storage device that can interface with a computer and transfer data between the computer and the computer readable media. Some non-limiting examples of computer readable media are: an external computer connected to the system, an Internet connection, a Compact Disk (CD), a Digital Versatile Disk/ Digital Video Disk (DVD), a floppy disk, a magnetic tape, an Internet web camera, a direct satellite link, a video cassette recorder (VCR), a removable hard drive, a digital camera, a video camera, a video cassette, an electronic email, a printer, a scanner, a fax, a solid-state recording media, a modem, a read only memory (ROM), and flash-type memories.

Global matching strategy—The term "global matching strategy," as used herein, indicates that rather than computing a probability of match for individual features, a probability of global match for an entire set of features is computed by taking into account the spatial arrangement of sets of features in the object or in the scene. The global matching strategy first finds all the spatially local persistent feature groupings from the images captured from an uncalibrated image capturing device location, and then the global matching strategy computes the correspondence or similarity match between the feature groupings from two uncalibrated image capturing device locations for every possible pair-wise combinations of uncalibrated image capturing device locations.

Images from uncalibrated views of the uncalibrated image capturing device location—The term "images from uncalibrated views of the uncalibrated image capturing device location," as used herein, denotes a set of images that have been captured from the same uncalibrated image capturing device location, where each image in the set is captured at a different pan-tilt setting of the uncalibrated image capturing device. That is, the term "images from uncalibrated views of the uncalibrated image capturing device location" denotes a set of images containing different views captured from a single uncalibrated image capturing device location, where each view corresponds to a distinct pan-tilt setting of the uncalibrated image capturing device.

Image capturing device—The term "image capturing device," as used herein, denotes any imaging recording devices used to capture visual information from the scene, and store this visual information in an imaging recording media. Some non-limiting examples of image capturing devices are: a still camera, a video camera, a Magnetic Resonance Imaging (MRI) recording mechanism, an ultrasound recording apparatus, a digital camera, a scanner, a fax machine, an Internet web camera, a video cassette recorder (VCR), and a solid-state recording media.

Imaging recording media—The term "imaging recording media," as used herein, denotes any media used to store visual information about an object or a scene. Some non-limiting examples of imaging recording media are: a Compact Disk (CD), a Digital Versatile Disk/Digital Video Disk (DVD), a floppy disk, a removable hard drive, a digital camera, a video cassette, a Magnetic Resonance Imaging (MRI) recording media, an ultrasound recording media, a solid-state recording media, a printed picture, a scanned document, a magnetic tape, and a faxed document.

Means—The term "means" when used as a noun with respect to this invention generally indicates a set of operations to be performed on a computer, and may represent pieces of a whole program or individual, separable, software (or hardware) modules. Non-limiting examples of "means" include computer program code (source or object code) and "hard-coded" electronics. The "means" may be stored in the memory of a computer or on a computer readable medium. In some cases, however, the term "means" refers to a class of device used to perform an operation, and thus the applicant intends to encompass within this language any structure presently existing or developed in the future that performs the same operation.

Non-overlapping views—The term "non-overlapping view," as used herein, is a standard term used when two three-dimensional models of a scene which have been extracted from two different uncalibrated image capturing device locations are compared with each other and one or both of the three-dimensional models contain a view where the scene or object of interest is completely occluded and non-visible from the image capturing device field of view. Such two three-dimensional models are said to share with each other "non-overlapping views" of a portion of a scene, wherein a portion of a scene comprises at least one object of interest.

Robust—The term "robust," as used herein, indicates that the global matching algorithm of an embodiment of the invention emphasizes the "structural description" of an object, and uses the object's prior shape information to lead to a robust matching scheme, robust in the sense that the matching scheme is tolerant of slightly overlapping views of an object and tolerant of partial occlusions of the object of interest. Thus, the robust matching scheme of an embodiment of the invention supports the detection of missing features and occlusions between views.

Overlapping views—The term "overlapping views," as used herein, is a standard term used when two three-dimensional models of a scene which have been extracted from two different uncalibrated image capturing device locations are compared with each other and both of the three-dimensional models contain a full view of the scene or object of interest. Such two three-dimensional models are said to share with each other fully "overlapping views" of a portion of a scene, wherein a portion of a scene comprises at least one object of interest.

Partial overlapping views—The term "partial overlapping view," as used herein, is a standard term used when two three-dimensional models of a scene which have been extracted from two different uncalibrated image capturing device locations are compared with each other and one or both of the three-dimensional models contain a partial view of the scene or object of interest. Such two three-dimensional models are said to share with each other "partial overlapping views" of a portion of a scene, wherein a portion of a scene comprises at least one object of interest.

Slightly overlapping views—The term "slightly overlapping view," as used herein, is a standard term used when two three-dimensional models of a scene which have been extracted from two different uncalibrated image capturing device locations are compared with each other and one or both of the three-dimensional models contain only a view of a small portion of the scene or object of interest. Such two three-dimensional models are said to share with each other only "slightly overlapping views" of a portion of a scene, wherein a portion of a scene comprises at least one object of interest.

Uncalibrated image capturing device—The term "uncalibrated image capturing device," as used herein, denotes an image capturing device that is placed at an unknown location, where a user does not know the distance between the image capturing device and the desired scene or objects that are being captured by the uncalibrated device. Moreover, in a system where multiple image capturing devices are used to capture a scene of interest, the exact coordinate location of a "uncalibrated image capturing device" in the system with respect to the location of any of the other image capturing devices in the system is not known by any of the other devices in the system.

Uncalibrated view—The term "uncalibrated view," as used herein, denotes the field of view of an image capturing device that is placed at an unknown location, resulting in a user not knowing the distance between the image capturing device and the desired scene or objects that are being captured by the uncalibrated device.

User—The term "user," as used herein, is a standard term denoting a person utilizing the method for generating three-dimensional models from still imagery or video streams from uncalibrated views.

(2) Overview

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, elements, files, and coefficients.

It is to be understood, that all of these, and similar terms, are to be associated with the appropriate physical quantities, and are merely convenient labels applied to these quantities. Unless specifically stated otherwise, as will be apparent from the following discussions, it is appreciated that throughout the present disclosure, discussions utilizing terms such as "processing," "calculating," "extracting," "determining," "inputting," "modeling," "obtaining," "outputting," or "displaying" refer to the action and processes of a computer system, or a similar electronic device that manipulates and transforms data represented as physical (electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

The present invention, in one embodiment, provides a system for generating three-dimensional models from still imagery or video streams from uncalibrated views. The system includes a "three-dimensional modeling" algorithm designed to form a three-dimensional structure modeling a scene viewed from an uncalibrated image capturing device. The "three-dimensional modeling" algorithm creates the three-dimensional structure by utilizing visual information about the scene extracted from multiple images captured at different pan-tilt settings of the uncalibrated image capturing device, that is images from different views captured by an image capturing device that is placed on an unknown location (uncalibrated location) where a user does not know the distance between the image capturing device and the desired scene or objects being captured. Once a three-dimensional structure associated with a particular uncalibrated image capturing device location has been formed, additional three-dimensional structures associated with other available uncalibrated image capturing device locations are formed using the "three-dimensional modeling" algorithm. The system further includes a "three-dimensional model stitching" algorithm designed to stitch together the previously formed three-dimensional structures modeling the scene viewed from a subset of the uncalibrated image capturing device locations, where the stitching yields an overall three-dimensional model of the scene. Then, the system outputs the overall three-dimensional model of the scene to a user.

In the case when there are several uncalibrated image capturing devices placed at various uncalibrated locations, some of the fields of view of the uncalibrated image capturing devices may be obstructed by clutter or obstacles blocking the view of the desired scene or desired object, thus yielding partial views of the scene of interest and even views where the scene or object of interest are completely occluded and non-visible from the image capturing device field of view. Therefore, when two three-dimensional models of a scene which have been extracted from two different uncalibrated image capturing device locations are compared with each other, there are four different possible scenarios that will result: when both three-dimensional models contain a full view of the scene or object of interest, these two three-dimensional models share with each other fully "overlapping views of a portion of a scene"; when one or both of the three-dimensional models contain a partial view of the scene or object of interest, these two three-dimensional models share with each other only "partial overlapping views of a portion of a scene"; when one or both of the three-dimensional models contain only a view of a small portion of the scene or object of interest, these two three-dimensional models share with each other only "slightly overlapping views of a portion of a scene"; or when one or both of the three-dimensional models contain a view where the scene or object of interest are completely occluded and non-visible from the image capturing device field of view, then these two three-dimensional models share with each other "non-overlapping views of a portion of a scene."

Therefore, the "three-dimensional model stitching" algorithm of the present invention allows the user to stitch together a three-dimensional structure modeling a scene which has only a slightly overlapping view of the scene of interest, with a three-dimensional structure modeling the scene which has a full or partially overlapping view of the scene containing the slightly overlapping view of the scene from the first three-dimensional structure. Thus, an scene or object of interest does not need to be fully viewed by an uncalibrated image capturing device in order to be stitched together with other three-dimensional structures or models of the same scene, the system only requires that the three-dimensional structures or models to be stitched together share at least a slightly overlapping view of the scene or object of interest, in order for the system to be able to find the best overlapping points between the three-dimensional structures or models, and then use these best overlapping points as the stitching points to connect the three-dimensional structures or models.

In one embodiment of the present invention, the system extracts features from the images captured at different pan-tilt settings of an uncalibrated image capturing device. Then, the system identifies any features in an image that do not have a corresponding matching feature in the other images from the uncalibrated image capturing device and eliminates all these "unpaired features" from any future processing. Next, the system computes the correspondence (similarity match) between the features from an image with the features extracted from the other images captured from the same uncalibrated image capturing device location. The system typically computes the correspondence between features by using a technique selected from a group consisting of: probabilistic matching, correlation measure, chi-square statistical measure, and dot product of feature vectors, although other techniques may be operative.

Once the correspondence between features is computed, the system forms a three-dimensional structure, modeling a scene viewed from the uncalibrated image capturing device location by using a "structure from motion" algorithm. The "structure from motion" algorithm computes the motion of the uncalibrated image capturing device from the correspondence established from the images of uncalibrated views captured at different pan-tilt settings of the uncalibrated image capturing device. Then, the "structure from motion" algorithm simulates a three-dimensional structure modeling the scene from the previously computed motion of the uncalibrated image capturing device.

In addition to generating three-dimensional models from uncalibrated views of an uncalibrated image capturing device such as a video camera, the system is also capable of generating three-dimensional models from still imagery as long as there are multiple views of a scene captured by the still imagery. Therefore, an embodiment of the invention generates three-dimensional models from uncalibrated images captured by a still camera connected to the system (or from printed pictures scanned into the system) so long as there are multiple still images of the scene captured by the still camera at different pan-tilt settings.

A flow chart depicting the operating acts of the present invention is shown in FIG. 1. The blocks in the diagram represent the functionality of the apparatus of the present invention. The flow chart is divided into two portions, representing the operation of the "forming a three-dimensional model of a scene viewed from an uncalibrated image capturing device location" portion 100 and the "stitching together the three-dimensional models from multiple uncalibrated image capturing device locations" portion 102. The "forming a three-dimensional model of a scene viewed from an uncalibrated image capturing device location" portion 100 contains the elements 106, 108, 110, 112, and 114, which will be subsequently described in greater detail. The "stitching together the three-dimensional models from multiple uncalibrated image capturing device locations" portion 102 contains the elements 116, 118, 120, and 122, which will be also described in greater detail below. The embodiment of the present invention performs the operations of the "forming a three-dimensional model of a scene viewed from an uncalibrated image capturing device location" portion 100 followed by the operations of the "stitching together the three-dimensional models from multiple uncalibrated image capturing device locations" portion 102, which results in an overall three-dimensional model of the scene.

After starting 104, an operation of receiving images from uncalibrated views of an uncalibrated image capturing device location 106 is performed, wherein the images contain different views of a scene captured from a single uncalibrated image capturing device location, where each image view corresponds to a distinct pan-tilt setting of the uncalibrated image capturing device. The images from uncalibrated views of an uncalibrated image capturing device are fed into the system by an inputting means comprised of, but not limited to, a still camera, a video camera, a scanner, a fax machine, an external computer connected to the system, a Magnetic Resonance Imaging (MRI) recording mechanism, an ultrasound recording apparatus, an internet connection, an internet web camera, a direct satellite link, a video cassette recorder (VCR), a digital versatile disc (DVD) player, or imaging recording media used to gather snapshots of a desired portion of a scene at multiple uncalibrated views, such as an optical storage device, e.g., a compact disc (CD) or digital versatile disc (DVD), a magnetic storage device such as a floppy disk or magnetic tape, a printed picture, a scanned document, a faxed document, a digital camera, a video cassette, a Magnetic Resonance Imaging (MRI) recording media, an ultrasound recording media, and a solid-state recording media. Other, non-limiting examples of computer readable media include hard disks, read only memory (ROM), and flash-type memories.

After receiving the images from uncalibrated views of an uncalibrated image capturing device location, the embodiment of the invention performs an operation 108 of extracting features from the images from uncalibrated views, wherein the features extracted include at least one of corner features, high entropy points, local edge features, and contour features. Then, the present invention computes the correspondence 110 (the similarity match) between the features extracted from the images from the uncalibrated views captured from an uncalibrated imaging capturing device location. Next, the embodiment of the invention forms a three-dimensional model 112 of the scene viewed from the uncalibrated imaging capturing device location.

The embodiment uses a "structure from motion" algorithm to form the three-dimensional model of the scene viewed from the uncalibrated imaging capturing device location. The "structure from motion" algorithm uses the motion detected from the images of uncalibrated views captured at different pan-tilt settings to simulate a three-dimensional structure (model) modeling at least a portion of the scene. Then the embodiment of the invention performs the operation 114 of iterating to form three-dimensional models of at least a portion of a scene viewed from other uncalibrated image capturing device locations, the embodiment iterates 114 until it exhausts all uncalibrated image capturing device locations available.

The "stitching together the three-dimensional models from multiple uncalibrated image capturing device locations" portion 102 of the invention is performed once the system finishes creating all of the three-dimensional models of a scene viewed from all uncalibrated image capturing device locations available to the system. The stitching portion starts by performing an operation 116 of finding "spatially local persistent feature groupings" from the uncalibrated views captured at an uncalibrated image capturing device location, then the embodiment iterates 118 back to perform operation 116 of finding "spatially local persistent feature groupings" for all the uncalibrated image capturing device locations available to the system. By finding the "spatially local persistent feature groupings" corresponding to an uncalibrated image capturing device location, the embodiment of the invention takes into account the spatial arrangement in the scene of all the features extracted from the uncalibrated image capturing device location. Therefore, the present invention obtains a more reliable global correspondence by considering the entire "spatially local persistent feature groupings", taking into account their spatial arrangement in the scene, rather than computing a probability of match for individual features between two uncalibrated image capturing device locations. Thus, the embodiment performs an operation 120 of computing correspondence between the sets of feature groupings from two uncalibrated image capturing device locations for a subset of pair-wise combinations of uncalibrated image capturing device locations.

In another embodiment of the invention, the correspondence between features for an individual uncalibrated image capturing device location and the correspondence between sets of feature groupings from two uncalibrated image capturing device locations are computed by using a technique selected from a group consisting of: probabilistic matching, correlation measure, chi-square statistical measure, and dot product of feature vectors. In a further embodiment, the correspondence is computed using a probabilistic matching method, where the probabilistic matching method computes probabilities of match between features by using prior information representing a scene, and where the probabilities of match between features correspond to a posteriori probabilities.

Once the correspondence between sets of feature groupings for every possible pair-wise combination of uncalibrated image capturing devices is completed, the embodiment of the invention performs the operation 122 of searching for the best matches, whereby multiple three-dimensional models from a subset of uncalibrated image capturing device locations are thus "stitched" together to form an overall three-dimensional model of at least a portion of a scene. The best matches or "stitching points" used to connect the two three-dimensional models from two uncalibrated image capturing devices are found by maximizing the correspondence found between both of the uncalibrated image capturing devices. Thus, in order to find the "stitching points," the system forms a correspondence matrix by using the previously found a posteriori probabilities, then the system establishes a one-to-one correspondence between the feature groupings from two uncalibrated image capturing device locations by maximizing the correspondence matrix. In a further embodiment of the invention, a Sinkhorn normalization process is used to form the correspondence matrix, and a Ransac robust estimation algorithm is used to find peaks on the correspondence matrix, wherein the peaks on the correspondence matrix indicate where the three-dimensional models from the uncalibrated image capturing device locations are to be stitched together.

Once the "stitching together the three-dimensional models from multiple uncalibrated image capturing device locations" portion 102 of the invention is completed, the embodiment of the invention outputs the overall three-dimensional model of at least a portion of a scene to the user. This information may be presented in visual, audio, kinesthetic, or other forms, depending on the requirements of the specific embodiment. In an embodiment of the invention, the overall three-dimensional model is provided to the user using an outputting device selected from a group consisting of at least one of: a computer monitor, a video camera connected to a computer, and a computer readable media used to display the overall three-dimensional model of a portion of a scene, the computer readable media selected from a group consisting of an imaging Compact Disk (CD), a Digital Versatile Disk/Digital Video Disk (DVD), a floppy disk, a removable hard drive, a video cassette, and a solid-state recording media. After the overall three-dimensional model has been provided to the user, the system may end or continue, at which point it stops or begins to retrieve new images from uncalibrated views of a new uncalibrated image capturing device location to be processed by the invention.

The blocks in the flowchart of FIG. 1 may also be viewed as a series of functional modules and sub-modules, representing either software or hardware modules depending on the particular embodiment. These modules operate within the processor and memory of a general-purpose or special-purpose computer system and may be in the form of software instructions or "hard-coded" electronic circuits.

(3) Principal Embodiments of the Present Invention

The present invention has three principal embodiments. The first is an apparatus for generating three-dimensional models from still imagery or video streams from uncalibrated views, typically, but not limited to, a computer system operating software in the form of a "hard coded" instruction set. This apparatus may also be specially constructed, as an application-specific integrated circuit (ASIC), or as a readily reconfigurable device such as a field-programmable gate array (FPGA). The second principal embodiment is a method, typically in the form of software, operated using a data processing system (computer).

The third principal embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. In addition, an imaging system may be developed within the scope of the present invention. These (aspects) embodiments will be described in more detail below.

Figure 2:
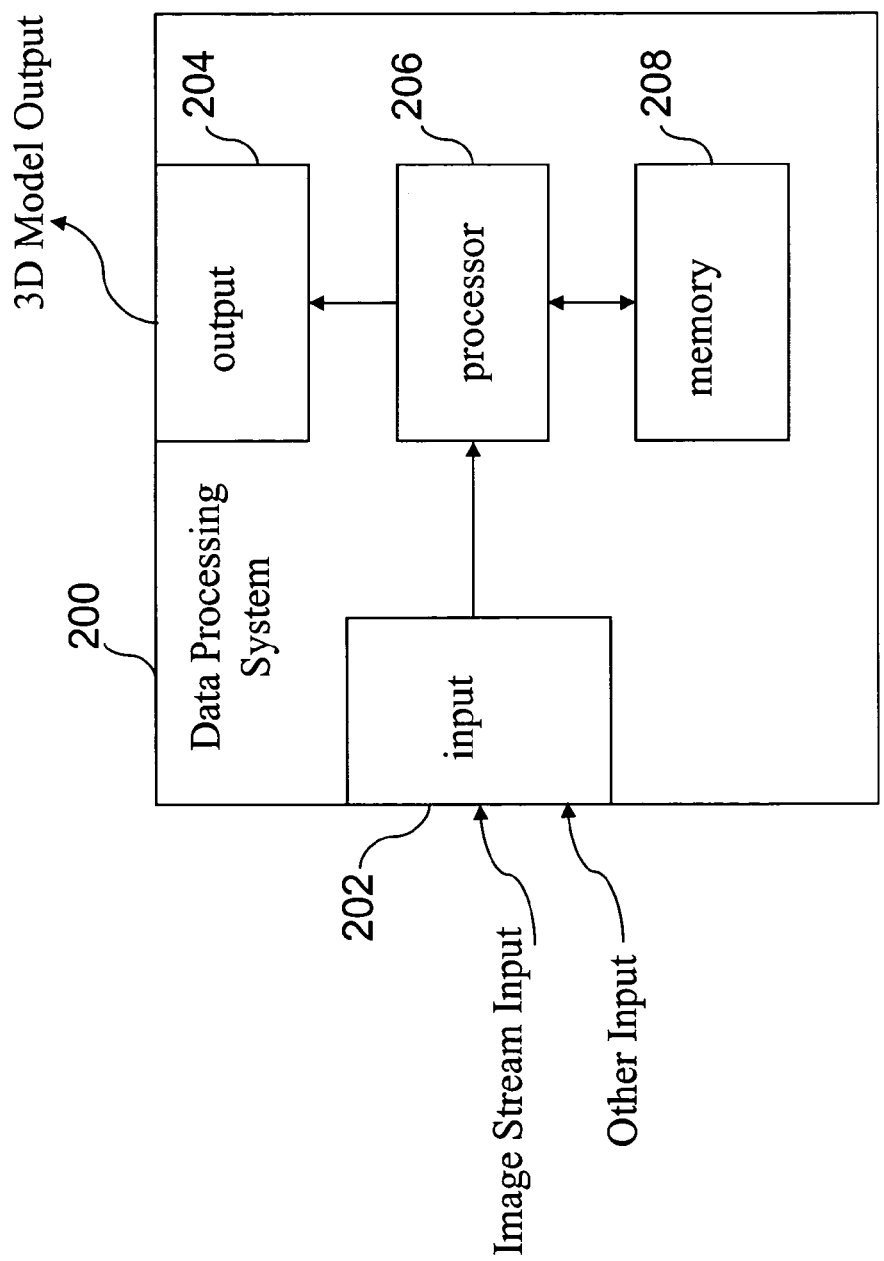
FIG. 2 is a block diagram depicting the components of a computer system used with the present invention.

A block diagram depicting the components of a computer system used in the present invention is provided in FIG. 2. The data processing system 200 comprises an input 202 for receiving images from an uncalibrated inputting means, still camera, video camera, digital camera, or any computer readable medium storing snapshots of a desired object at multiple uncalibrated views, such as a floppy disk, Compact Disk (CD), a Digital Versatile Disk/Digital Video Disk (DVD), a video cassette, and a removable hard drive. The input 202 may also be configured for receiving user input from another input device such as a microphone, a keyboard, a mouse, or drawing pads in order for the user to be able to provide the information to the system. For example, information regarding the choice of the uncalibrated views for which the user wishes to generate a three-dimensional model. Note that the input 202 may include multiple "ports" for receiving data and user input. It may also be configured to receive information from remote databases using wired or wireless connections. The output 204 is connected to the processor for providing output to the user on a video display or other device with a three-dimensional model of the scene or object viewed, but also possibly through audio or kinesthetic signals (e.g., through pinching, vibrations, heat, etc.). Output may also be provided to other devices or other programs, e.g. to other software modules, for use therein, possibly serving as a wired or wireless gateway to external databases or other processing devices. The input 202 and the output 204 are each coupled with a processor 206, which may be a general-purpose computer processor or a specialized processor designed specifically for use with the present invention. The processor 206 is coupled with a memory 208 to permit storage of data and software to be manipulated by commands to the processor. Typical manifestations of the data processing system 200 may be incorporated into vehicles, cellular phones, portable digital assistants, and computers. It should be recognized by those skilled in the art that multiple processors may also be used and that the operations of the invention can be distributed across them.

Figure 3:
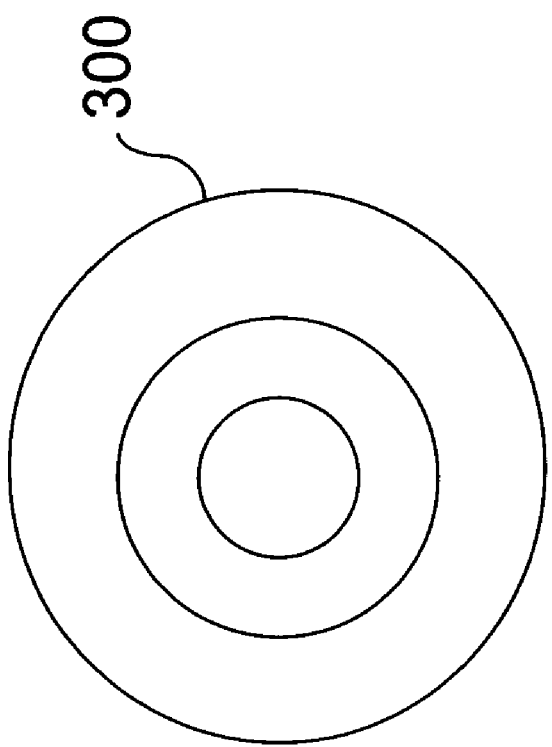
FIG. 3 is an illustrative diagram of a computer program product embodying the present invention.

An illustrative diagram of a computer program product embodying the present invention is depicted in FIG. 3. The computer program product 300 is depicted as an optical disk such as a CD or DVD. However, as mentioned previously, the computer program product generally represents computer readable code stored on any compatible computer readable medium.

(4) Detailed Description of the Elements

A detailed description of an embodiment of the present invention, a method for generating three-dimensional models from still imagery or video streams from uncalibrated views, is presented, as set forth schematically in the flow chart shown in FIG. 1. In this detailed embodiment, the blocks in the diagram shown in FIG. 1 represent the functionality of the apparatus of the present invention.

The detailed embodiments of the various features discussed previously in the Overview section will be presented below.

The Forming of a Three-Dimensional Model from an Uncalibrated Image Capturing Device Location Portion The general aspects of the "forming of a three-dimensional model from an uncalibrated image capturing device location" portion 100 were described above in relation to FIG. 1. Specifics regarding an embodiment will now be presented.

Establishing corresponding features in two images taken from disparate viewing angles, such as different pan-tilt settings, is considered a difficult problem by skilled artisans working in the computer vision field. The severity of the problem is compounded by the fact that the images may be obtained from uncalibrated image capturing devices placed at an unknown distance from the scene or the object of interest, and the images may be captured under different lighting conditions and different image capturing device parameters. Therefore, solving this problem is an important step in applications such as a 3D model alignment, where partial models generated from partially overlapping views of a portion of a scene, often created from video sequences, are combined together to create a holistic one, an overall three-dimensional model of the scene. The stitching or fusion of these partial models requires matching features from images obtained from each of the uncalibrated image capturing devices. However, the extraction of such image features (like the intensity or shape of significant features) is an inherently noisy process and is dependent upon the imaging conditions; thus, most methods are susceptible to error. In addition, it is extremely difficult to compute features that are invariant under different imaging conditions, specially when the location of the image capturing device is unknown to the system or to the user. Therefore, in a detailed embodiment of the present invention, the embodiment shows that the incorporation of prior information extracted from the spatio-temporal volume of video data into the "computing correspondence" portion of the invention, results in a robust algorithm for stitching together 3D models extracted from multiple uncalibrated image capturing device locations.

In an embodiment of the present invention, the embodiment extracts an edge image of local features extracted from uncalibrated views of the uncalibrated image capturing device location. By using this edge image of local features, the embodiment gives an approximate notion of the 2D shape of any particular feature extracted from an uncalibrated view of an uncalibrated image capturing device location. Then, the embodiment computes a correspondence matrix, a doubly stochastic matrix, by using a Sinkhorn normalization process and any prior information (available to the user) describing the scene. This correspondence matrix used by the invention represents the probability of match between the features from images from the uncalibrated views captured from the uncalibrated image capturing device location.

An embodiment of the present invention incorporates prior information about a scene or an object of interest into the design of the detection strategy, thus leading to an optimal algorithm (in the sense of minimum Bayes risk). The embodiment initially collects the prior information once for different classes of scenes and objects and then utilizes this prior information to generate three-dimensional models across different objects within the class. A non limiting example of prior information about a scene or an object is the information that can be collected from video sequences of one or more faces, and then this information is used by the invention to generate three-dimensional models of faces from still imagery or video streams from uncalibrated image capturing device views across a large number of input faces with similar characteristics.

Receiving Images from Uncalibrated Views of an Uncalibrated Image Capturing Device Location The embodiment of the invention utilizes visual information about the scene, extracted from multiple images captured at different pan-tilt settings of an uncalibrated image capturing device to form a three-dimensional model of the scene viewed from the uncalibrated image capturing device location. The image capturing device is classified as uncalibrated because the image capturing device is placed at an unknown location (uncalibrated location) where a user does not know the distance between the image capturing device and the desired scene or objects being captured. Furthermore, the different views captured by an uncalibrated image capturing device using different pan-tilt settings are also classified as uncalibrated views.

The embodiment receives images from uncalibrated views of an uncalibrated image capturing device fed into the system by an inputting means comprised of, but not limited to, a still camera, a video camera, a scanner, a fax machine, an external computer connected to the system, a Magnetic Resonance Imaging (MRI) recording mechanism, an ultrasound recording apparatus, an internet connection, an internet web camera, a direct satellite link, a video cassette recorder (VCR), a digital versatile disc (DVD) player, or an imaging recording media used to gather snapshots of a desired portion of a scene at multiple uncalibrated views, such as an optical storage device, e.g., a compact disc (CD) or digital versatile disc (DVD), a magnetic storage device such as a floppy disk or magnetic tape, a printed picture, a scanned document, a faxed document, a digital camera, a video cassette, a Magnetic Resonance Imaging (MRI) recording media, an ultrasound recording media, and a solid-state recording media. Other, non-limiting examples of computer readable media include hard disks, read only memory (ROM), and flash-type memories.

In addition, the system admits images from uncalibrated views generated from a variety of "arrays of uncalibrated image capturing devices," where the "arrays of uncalibrated image capturing devices" consist of either a single uncalibrated image capturing device viewing a scene at multiple pan and tilt settings, or an array formed by multiple uncalibrated image capturing devices viewing the scene from different locations, or an array formed by multiple uncalibrated image capturing devices placed at different locations with each uncalibrated device in the array viewing the scene at multiple pan and tilt settings.

Moreover, the invention is robust to partial views of an object and works for images containing overlapping views of a portion of a scene, images containing partially overlapping views of a portion of a scene, images containing slightly overlapping views of a portion of a scene, and images containing non-overlapping views of a portion of a scene. In the case when there are several uncalibrated image capturing devices placed at various uncalibrated locations, some of the fields of view of the uncalibrated image capturing devices may be obstructed by clutter or obstacles blocking the view of the desired scene or desired object, thus yielding partial views of the scene of interest and even views where the scene or object of interest are completely occluded and non-visible from the image capturing device field of view. An advantage of the invention is that the embodiment allows a user to stitch together a three-dimensional structure modeling a scene which has only a slightly overlapping view of the scene of interest, with a three-dimensional structure modeling the scene which has a full or partially overlapping view of the scene containing the slightly overlapping view of the scene from the first three-dimensional structure. Therefore, a scene or object of interest does not need to be fully viewed by an uncalibrated image capturing device in order to be stitched together by the invention with other three-dimensional models viewing the same scene Extracting Features From Images From Every Uncalibrated View There are several types of features extracted by the invention in order to built a three-dimensional model from the images from uncalibrated views of an uncalibrated image capturing device location. Some non-limiting examples of the features extracted by the embodiment are corner features, high entropy points, local edge features, and contour features.

In an embodiment of the invention, the sets of features extracted from the images from uncalibrated views of an uncalibrated image capturing device location are represented as sets of random points, $X=[X_1, \ldots, X_N]$ and $Y=[Y_1, \ldots, Y_M]$, where each of the elements of these sets represents a collection of corner features in a local region around the feature of interest, which coarsely represents the two-dimensional (2D) shape of the region. Hence, the embodiment aims to obtain correspondences between two sets of corner features or shape cues.

Although, the shapes of different features are usually significantly different, and therefore easier to match, they are dependent on the viewing angle and often the extraction process is extremely sensitive to noise. To overcome this, the embodiment of the invention uses "priors," which are the mean shape of each feature ("mean feature") collected over a range of viewing angles from images containing the desired scene or object of interest, where these images were previously captured from multiple views of an image capturing device viewing the desired scene or object of interest. Therefore, the embodiment uses prior information about multiple scenes and objects of interest, where the prior information was previously collected and stored in the system, to make the embodiment robust to the changes in the shapes of the various features produced by the changes in the viewing angles. Since the shapes of the features extracted from views of human faces do not vary drastically for different people, the present embodiment uses as a non-limiting example, the case of generating three-dimensional models from uncalibrated views of human faces. In this non-limiting case, the embodiment collects the prior information only once since the shape of the features in human faces do not vary drastically, and then the embodiment uses this prior information to build 3D models of novel faces viewed by uncalibrated image capturing devices.

Computing Correspondence between Features and the Correspondence between Sets of Feature Groupings The embodiment uses several types of techniques to compute correspondence between features in order to build a three-dimensional model from the images from uncalibrated views of an uncalibrated image capturing device location. Some non-limiting examples of these techniques used by the embodiment to compute correspondence are: probabilistic matching, correlation measure, chi-square statistical measure, and dot product of feature vectors. Furthermore, the system uses these same techniques to compute correspondence between spatially local persistent feature groupings from the uncalibrated views captured at an uncalibrated image capturing device location, during the "stitching together the three-dimensional models from multiple uncalibrated image capturing device locations" portion of the invention.

In an embodiment of the invention, the system computes the correspondence between features and the correspondence between sets of feature groupings using a probabilistic matching method, where the probabilistic matching method computes probabilities of match between features by using prior information representing a portion of a scene. In this embodiment, the probabilities of match between features correspond to a posteriori probabilities. A detailed description of the probabilistic matching method used by the embodiment to compute the correspondence between features in the "forming a three-dimensional model from an uncalibrated image capturing device location" portion of the invention and to compute the correspondence between feature groupings in the "stitching together the three-dimensional models from multiple uncalibrated image capturing device locations" portion of the invention, will be presented below.

Probabilistic Matching Method Computing a posteriori Probabilities of Match between Features by Using Prior Information Let $X=[X_1, \ldots, X_N]$ and $Y=[Y_1, \ldots, Y_M]$ denote two sets of features extracted from two images from uncalibrated views, wherein a total of N features was extracted from an uncalibrated view, and a total of M features was extracted from another uncalibrated view.

Let $\mu=\mu_1, \ldots, \mu_K$ represent a set of features extracted from prior information, wherein a total of K features was extracted from prior information of the portion of the scene. Let $H_i$ be the hypothesis that a feature $Y_i$ matches the set of features X, wherein i is a variable index with an integer value between 1 and M, and wherein i denotes an $i^{th}$ feature within the set of features Y, where we wish to compute the a posteriori probability $P(H_i|X)$, given the observation $X=X_n$.

Define the event $\xi_{X,\mu_j}$ {X matches $\mu_j$}, where $\xi_{X,\mu_j}$ denotes an event that {X matches $\mu_j$}, wherein j is a variable index with an integer value between 1 and K, and wherein j denotes $j^{th}$ feature within the set of prior features $\mu$. The embodiment hypothesizes that the probability of X matching $\mu_j$ is directly proportional to the inner product of X with $\mu_j$ (since the inner product gives a measure of similarity). Then $$P(\xi_{X,\mu_j} | X = X_n) = \frac{1}{\sum_{k=1}^{K} <X_n, \mu_k>} <X_n, \mu_j> \quad (1)$$

where the symbol $<,>$ denotes an inner product, where the inner product represents a measure of similarity. Therefore, $P(\xi_{X,\mu_j}|X=X_n)$ denotes a probability of the set of features X matching a prior information feature $\mu_j$ given that the set of features X includes of a feature $X_n$, wherein n is a variable index with an integer value chosen between 1 and N, and wherein n denotes a $n^{th}$ feature within the set of features X. Similarly, the probability that a feature $Y_i$ matches the set of features X given the event $\xi_{X,\mu_j}$ is proportional to the cross-correlation of $Y_i$ to $\mu_j$, $$P(H_i | X, \xi_{X,\mu_j}) = \frac{1}{\sum_{k=1}^{K} E<Y_i, \mu_k>} <Y_i, \mu_j>, \quad (2)$$

where E denotes a probabilistic expectation measure and $P(H_i|X,\xi_{X,\mu_j})$ denotes the probability of a feature $Y_i$ matching the set of features X given an event $\xi_{X,\mu_j}$ occurred (i.e. the set of features X matches the prior information feature $\mu_j$), wherein i denotes the $i^{th}$ feature within the set of features Y and j denotes the $j^{th}$ feature within the set of prior features $\mu$.

Then, from the theorem of total probability, the a posteriori probability $P(H_i|X)$ (which is the probability of a feature $X_n$ matching a feature $Y_i$) is given by $$P(H_i | X) = \sum_{k=1}^{K} P(H_i | X, \xi_{X,\mu_k}) P(\xi_{X,\mu_j} | X = X_n). \quad (3)$$

The a posteriori probabilities are represented in the form of a posteriori probability matrix $P(X,Y)$. The embodiment establishes correspondence between features or between feature groupings by maximizing the posteriori probabilities given by equation (3). Viewed from a Bayesian perspective, this is equivalent to minimizing the Bayes risk, which is the probability of error under the condition that incorrect decisions incur equal costs. Thus, this embodiment of the invention is optimal in the sense that it produces a minimum probability of mismatch.

Significance of Prior Information

In an embodiment, the system assumes that a feature $X_i(w)$ is corrupted by independent, zero mean, additive noise v (the notation $X_i(w)$ represents the $i^{th}$ feature from the $w^{th}$ viewing position.). Let $$X_i(w)=S_i(w)+v_i(w), w=1, \ldots L., \quad (4)$$

where $S_i(w)$ is the true unknown value of the feature. Then mean feature is $$\mu_i = E[X_i] = E[S_i] = \frac{1}{L(i)} \sum_{w=1}^{L(i)} X_i(w),$$

since the noise is zero-mean and independent of the true unknown value of the feature. Next, the embodiment computes the mean feature over a range of viewing angles L(i), where L(i) denotes the viewing angle of the $i^{th}$ feature, and L(i) can be different for different features and E denotes a probabilistic expectation measure. Thus, the embodiment computes the probability of a feature $X_n$ in one image matching another feature $Y_i$ in another image from equation (3). The probability is maximum when both the feature $X_n$, and the feature $Y_i$ match a particular prior feature $\mu_j$.

Identifying Unpaired Features

In matching features from two different uncalibrated views, it is important to identify features present in one uncalibrated view but not in the other. If a particular feature $X_n$ does not correspond to any feature in the set Y, then $P(H_i|X=X_n)$, i=1, . . . , M will not have any distinct peak (defined as the maximum whose difference with the second largest value exceeds a pre-defined threshold), and therefore the feature $X_n$ can be identified. Similarly, if $H_i$ is the hypothesis that $X_i$ matches Y, the a posteriori probability $(P(H_i|Y=Y_m)$, i=1, . . . , N) will have a relatively flat profile if the feature $Y_m$ does not have a corresponding match in the set of features X, in other words, the particular feature $Y_m$ (extracted from an uncalibrated view of an uncalibrated image capturing device location) does not have a corresponding match in any of the features in the set of features X that were extracted from a different uncalibrated view of the uncalibrated image capturing device location. In a similar manner, any unpaired spatially local persistent feature groupings (corresponding to two uncalibrated image capturing device locations) will have a a posteriori probability $(P(H_i|Y=Y_m)$, i=1, . . . , N) with a relatively flat profile if a particular spatially local persistent feature grouping $Y_m$ (extracted from an uncalibrated image capturing device location) does not have a corresponding match in any of the spatially local persistent feature groupings in the set of feature groupings X that were extracted from a different uncalibrated image capturing device location during the "stitching together the three-dimensional models from multiple uncalibrated image capturing device locations" portion of the invention.

Then, the embodiment of the invention identifies two unpaired features (or two unpaired spatially local persistent feature groupings) by computing an a posteriori probability relating both features (or spatially local persistent feature groupings), and then plotting the a posteriori probability and finding if the a posteriori probability has a relatively flat profile. In the case when the a posteriori probability has a relatively flat profile, the embodiment identifies the features that generated the a posteriori probability as being unpaired features (or unpaired spatially local persistent feature groupings), and then the embodiment eliminates these unpaired features (or unpaired spatially local persistent feature groupings) from being processed any further by the system.

Furthermore, the embodiment of the invention identifies and eliminates all the unpaired features prior to computing the correspondence between features in the "forming a three-dimensional model from an uncalibrated image capturing device location" portion of the invention, and prior to computing the computing correspondence between sets of feature groupings in the "stitching together the three-dimensional models from multiple uncalibrated image capturing device locations" portion of the invention. By eliminating all of the unpaired features and unpaired feature groupings prior to computing the correspondence matrix, the embodiment reduces the number of features or feature groupings that need to be matched, hence reducing the combinatorics of the matching problem and in turn the embodiment reduces the processing time required by the invention to generate three-dimensional models from still imagery or video streams from uncalibrated views.

Forming the Correspondence Matrix

Once the embodiment has determined the a posteriori probabilities of match between features (or match between spatially local persistent feature groupings) and the embodiment has eliminated all the unpaired features (or unpaired spatially local persistent feature groupings), the system uses the a posteriori probabilities to form a correspondence matrix. Then, the embodiment establishes a one-to-one correspondence between features from two uncalibrated views from an uncalibrated image capturing device location (or correspondence between spatially local persistent feature groupings from two uncalibrated image capturing device locations) by maximizing the correspondence matrix.

Therefore, from the a posteriori probabilities, the embodiment of the invention obtains a single doubly-stochastic matrix C(X,Y) (correspondence matrix), where each row denotes the probability of matching the features in the of set of features Y given a particular set of features X, and each column denotes the probability of matching the features of X given a particular Y. In order to create the correspondence matrix, the embodiment uses a Sinkhorn normalization process to obtain a doubly stochastic matrix by alternating row and column normalizations, as discussed in "A relationship between arbitrary positive matrices and doubly stochastic matrices," *Annals Math. Statist.* vol. 35, pp. 876-879, 1964 by R. Sinkhorn.

By using the Sinkhorn normalization process to generate the correspondence matrix, the embodiment of the invention allows the system to use either X or Y as the reference feature set. Furthermore, since the Sinkhorn normalization process requires that the unpaired features and unpaired feature groupings be identified and eliminated a priori, this embodiment reduces the number of features that need to be matched and hence the combinatorics of the matching problem.

Forming a Three-Dimensional Structure Modeling an Scene From the Uncalibrated Image Capturing Device Location Once the embodiment forms the correspondence matrix for the features from an uncalibrated image capturing device location, the embodiment uses a "structure from motion" algorithm to form a three-dimensional model of the scene viewed from the uncalibrated imaging capturing device location. The "structure from motion" algorithm uses the motion detected from the images of uncalibrated views captured at different pan-tilt settings to simulate a three-dimensional structure (model) modeling at least a portion of the scene. The embodiment computes the motion from the uncalibrated image capturing device from the correspondence established from the images of uncalibrated views captured at different pan-tilt settings of the uncalibrated image capturing device location. The details of the "structure from motion" algorithm are well-known to a those of ordinary skill in the art, and thus are not included in this application.

After forming the three-dimensional structure (model) modeling a scene viewed from an uncalibrated image capturing device location, the embodiment of the invention performs the operation of iterating to form three-dimensional models of at least a portion of a scene viewed from other uncalibrated image capturing device locations. The embodiment continues to iterate until exhausting all uncalibrated image capturing device locations available to the system.

The Stitching Together the Three-Dimensional Models from Multiple Uncalibrated Image Capturing Device Locations Portion The general aspects of the "stitching together the three-dimensional models from multiple uncalibrated image capturing device locations" portion were described above in relation to FIG. 1. Specifics regarding an embodiment will now be presented.

Finding Spatially Local Persistent Feature Groupings

Once the system finishes creating all of the three-dimensional models of a scene viewed from all uncalibrated image capturing device locations available to the system, the embodiment finds the "spatially local persistent feature groupings" from the uncalibrated views captured at an uncalibrated image capturing device location, and then the embodiment iterates back to find the "spatially local persistent feature groupings" for all the uncalibrated image capturing device locations available to the system.

The present invention obtains a more reliable global correspondence between features by considering the entire "spatially local persistent feature groupings," since the "spatially local persistent feature groupings" take into account the spatial arrangement of the features in the scene, rather than the system computing a probability of match for individual features between two uncalibrated image capturing device locations.

Consider, for the purposes of this analysis two sets of features X and Y having the same cardinality, say N (i.e. there are N features present in both sets X and Y). That is, $X=[X_1, \ldots, X_N]$ and $Y=[Y_1, \ldots, Y_N]$ denote two sets of features extracted from two images captured by two uncalibrated image capturing device locations. The embodiment of the invention assigns a probability of match of the set of features X against all possible permutations of the set of features Y. Let the permutations of features inside the feature set Y be represented by $Y^1, \ldots, Y^{N!}$, with $Y^i=[Y_{(i)}, \ldots, Y_{(N)}]$ where $[Y_{(i)}, \ldots, Y_{(N)}]$ represents an $i^{th}$ ordering of $[Y_1, \ldots, Y_N]$. Let $H^i$ represent the hypothesis that $Y^i$ matches the feature set X (note the superscript used to distinguish with the hypothesis for individual features). Assuming that each of the hypothesis $H^i$ is independent of every other hypothesis, $$P(H^i|X)=\Pi_{j=1}^N P(H_{(j)}|X_j), \quad (5)$$

where $H_{(j)}$ is the hypothesis that $Y_{(j)}$ matches $X_j$ for a particular permutation of $Y^1$, where j is a variable index with an integer value between 1 and N, and wherein j denotes an $j^{th}$ feature within the set of features X. This assumes the conditional independence of each hypothesis $H_j$. This is a valid assumption for the non-limiting example of features of the face, which do not change much with expression. The embodiment shows, by computing each of the probabilities in (5), that $P(H^1|X)$ is maximum when the permutation $Y^i$ matches the set X, element to element, thus generating a spatially local persistent feature grouping (element by element), as opposed to matching a single feature to a set of features.

Computing Correspondence between Sets of Feature Groupings

The embodiment works by matching the entire constellation of "spatially local persistent feature groupings" (or global features) in the two sets of views captured at two uncalibrated image capturing device locations by minimizing the probability of error of a match. The motivation for this global strategy (as opposed to the correspondence of individual features that are local to the region) is that it emphasizes the "structural description" of a scene or of an object.

Therefore, the embodiment uses several types of techniques to compute correspondence between "spatially local persistent feature groupings" such as probabilistic matching, correlation measure, chi-square statistical measure, and dot product of feature vectors. However, since the probabilistic framework supports the identification of missing features and occlusions between the two views, an embodiment of the invention uses a probabilistic matching technique to compute the correspondence between sets of features groupings from two uncalibrated image capturing device locations for a subset of pair-wise combinations of uncalibrated image capturing device locations. In addition, since the use of prior information of the shape of a scene or an object lends robustness to the embodiment of the invention, the embodiment uses a probabilistic matching method that computes the probabilities of match between feature groupings by using prior information representing a portion of a scene or an object.

An outline of the correspondence algorithm used by an embodiment of the invention is now presented:

Given two images from uncalibrated views of two uncalibrated image capturing device locations, $I_1$ and $I_2$, and the pre-computed prior information $\mu=\mu_1, \ldots, \mu_K$:

1. Feature Extraction: Compute the set of features $X=[X_1, \ldots, X_p]$ and $Y=[Y_1, \ldots, Y_M]$ using a suitable feature extraction method (for example, a corner-finder algorithm could be used).
2. Compute Probability of Match: Compute the match probabilities from (3) using the prior information $\mu=\mu_1, \ldots, \mu_K$.
3. Identify Unpaired Features: Identify those features present in one view, but not in the other. At the end of this process, the embodiment is left with two sets with the same cardinality (denoting the paired features), which must be matched. Denote them as $X=[X_1, \ldots, X_N]$ and $Y=[Y_1, \ldots, Y_N]$.
4. Sinkhorn Normalization: Compute the correspondence matrix C(X,Y) by applying the Sinkhorn normalization procedure to the match probabilities after removing the unpaired features.
5. Compute Probability for the Spatial Arrangement of the Features: Compute the a posteriori probability for matching X with all permutations of Y, i.e. $P(H^i|X)$, i=1, ..., N! from (5).
6. Search for Best Match: Obtain $i=\arg \max_i P(H^i|X)$. Assign $Y^i=[Y_{(1)}, \ldots, Y_{(N)}]$ as the match to X.

Searching for the Best Matches

Once the correspondence between sets of feature groupings for every possible pair-wise combination of uncalibrated image capturing devices is completed, the embodiment of the invention searches for the best matches, whereby multiple three-dimensional models from a subset of uncalibrated image capturing device locations are thus "stitched" together to form an overall three-dimensional model of at least a portion of a scene. The best matches or "stitching points" used to connect the two three-dimensional models from two uncalibrated image capturing devices are found by maximizing the correspondence found between pair-wise uncalibrated image capturing devices. Thus, in order to find the "stitching points," the invention uses a Ransac robust estimation algorithm to find peaks on the correspondence matrix, wherein the peaks on the correspondence matrix indicate where the three-dimensional models from the uncalibrated image capturing device locations are to be stitched together. The details of the Ransac robust estimation algorithm are well know to a person of ordinary skill in the art, and thus are not included in this application.

In order to reduce the processing time to generate three-dimensional models from still imagery or video streams from uncalibrated views, the embodiment of the invention reduces the search space from N!. For each $X=X_n$, n=1, ..., N for the paired sets of features, the embodiment identifies the set $\overline{Y}_n=\{Y_i:P(H_i|X=X_n)>p\}$, where p is an appropriately chosen threshold. Alternatively, the embodiment chooses the feature $\{Y_i\}$ that have the largest "I" values of the a posteriori densities. This smaller set identifies those features in Y that are the closest to a particular feature in X. Then the embodiment computes the probability of match for the permutations of Y using this reduced set. The actual number of elements contained in the search space will depend on the exact composition of $\overline{Y}_n$, n=1, ..., N.

Experimental Results

As an example, the detailed disclosed embodiment was tested by applying the embodiment to the problem of registering two images of a face taken from two distinct viewing directions from two uncalibrated image capturing device locations. The applied embodiment used a database of 24 faces of people whose images were obtained under different imaging conditions from uncalibrated views of multiple uncalibrated image capturing device locations. A subset of the database of faces were selected to demonstrate the capabilities of the detailed embodiment of the present invention. The test results presented herein are provided as a non-limiting examples of the capabilities of the present invention. Using the subset of faces, the embodiment presents the results of the probabilistic correspondence algorithm, and the result of the "stitching together the three-dimensional models from multiple uncalibrated image capturing device locations" portion of the invention, which utilizes a global alignment strategy. Finally, the applied embodiment shows how the method for generating three-dimensional models from uncalibrated views builds holistic three-dimensional models (overall three-dimensional model of at least a portion of a scene) from partial three-dimensional models obtained in the "forming a three-dimensional model from an uncalibrated image capturing device location" portion.

Feature Selection and Prior Extraction

Figure 4:
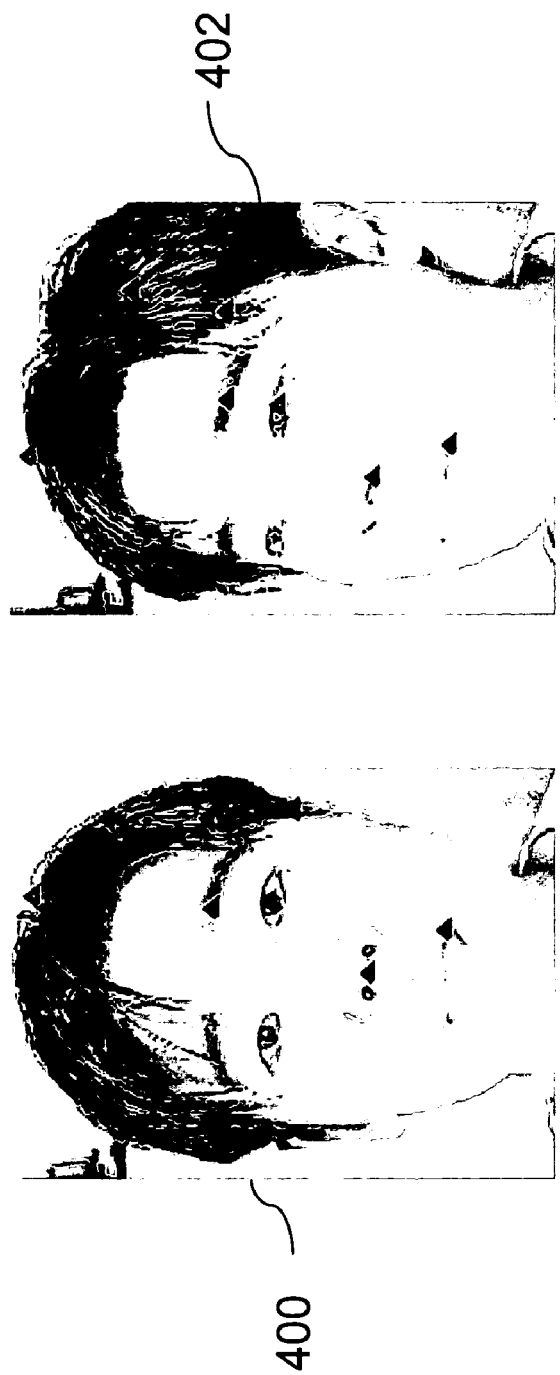
FIG. 4 is an image depicting features extracted using the present invention; wherein the features were extracted from two uncalibrated camera views.

To select the features that need to be registered, the embodiment uses a corner finder algorithm based on an interest operator, known in the art and discussed, for example in *Pattern Classification and Scene Analysis*, John Wiley and Sons, 1973 by R. Duda and P. Hart. The interest operator computes a matrix of second moments of a local gradient and determines corners in the image based on the eigenvalues of this matrix. Given the set of points defining the corners of the image, a clustering algorithm (e.g., k-means) was used by the embodiment to identify the feature points to be matched. The k-means algorithm computes the centroids of the corner points, and classifies their means as important features to be matched. FIG. 4 shows two sets of features that were identified using this strategy, where the features extracted from an uncalibrated front view of an uncalibrated image capturing device location are illustrated in 400, and the features extracted from an uncalibrated side view of another uncalibrated image capturing device location are illustrated in 402. The embodiment matches the entire local region around the feature points shown in FIG. 4, not just the points themselves. Hence, only a few such regions (less than 10) are enough, since there are only a few distinct aspects of a face.

Figure 5:
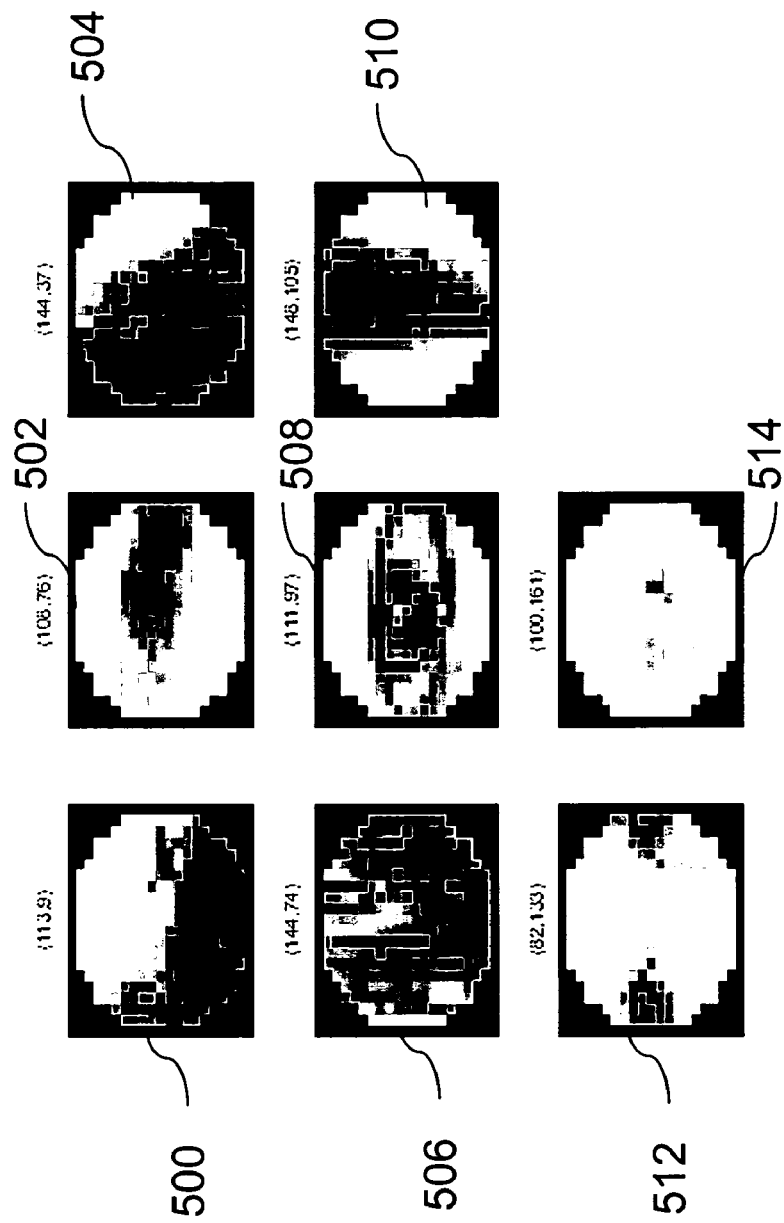
FIG. 5 is an image depicting intensity blocks around the features extracted from an uncalibrated frontal camera view of a face.
Figure 6:
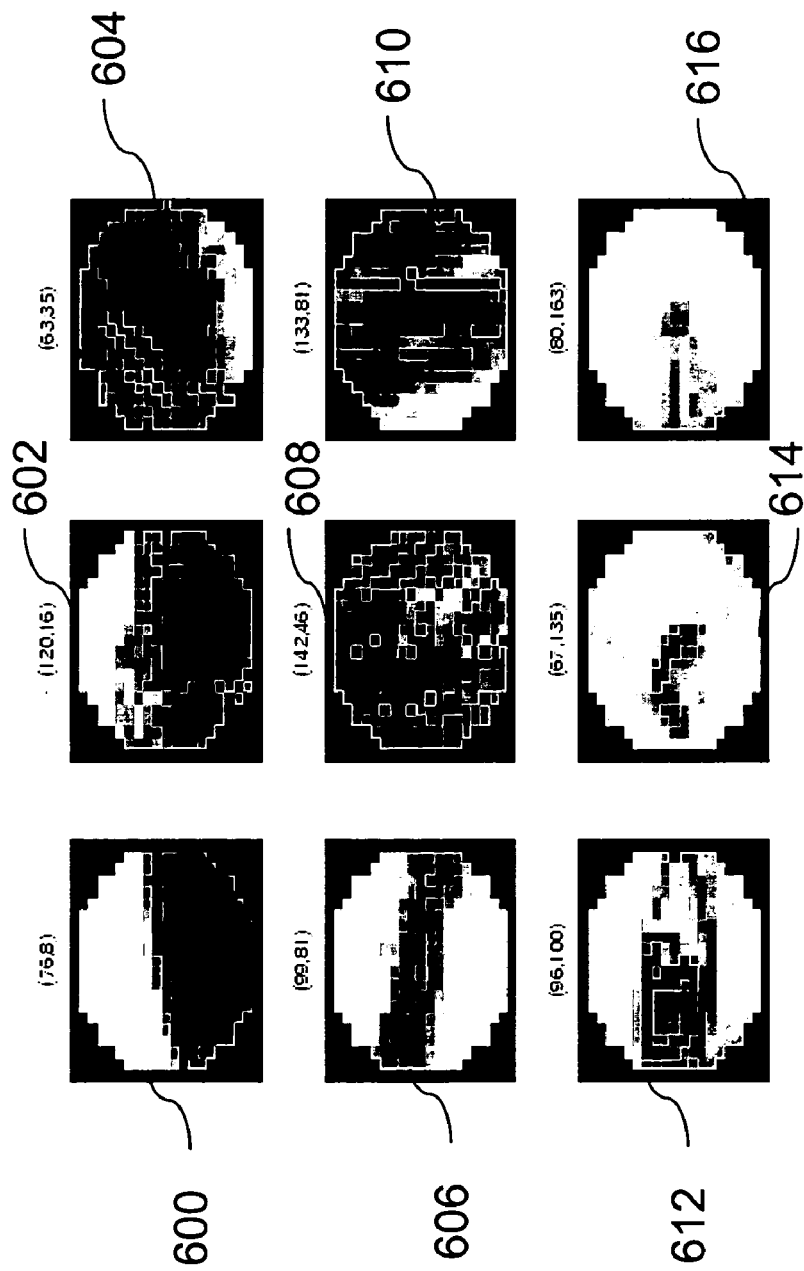
FIG. 6 is an image depicting intensity blocks around the features extracted from an uncalibrated sidewise camera view of the face.

FIG. 5 depicts plots of intensity blocks in the local regions around the features extracted from an uncalibrated frontal camera view of a face, where the images 500, 502, 504, 506, 508, 510, 512, and 514 correspond to intensity blocks around distinct face features extracted by an embodiment of the invention. FIG. 6 depicts plots of intensity blocks in the local regions around the features extracted from an uncalibrated sidewise camera view of a face, where the images 600, 602, 604, 606, 608, 610, 612, 614, and 616 correspond to intensity blocks around distinct face features extracted by the embodiment of the invention.

Figure 7:
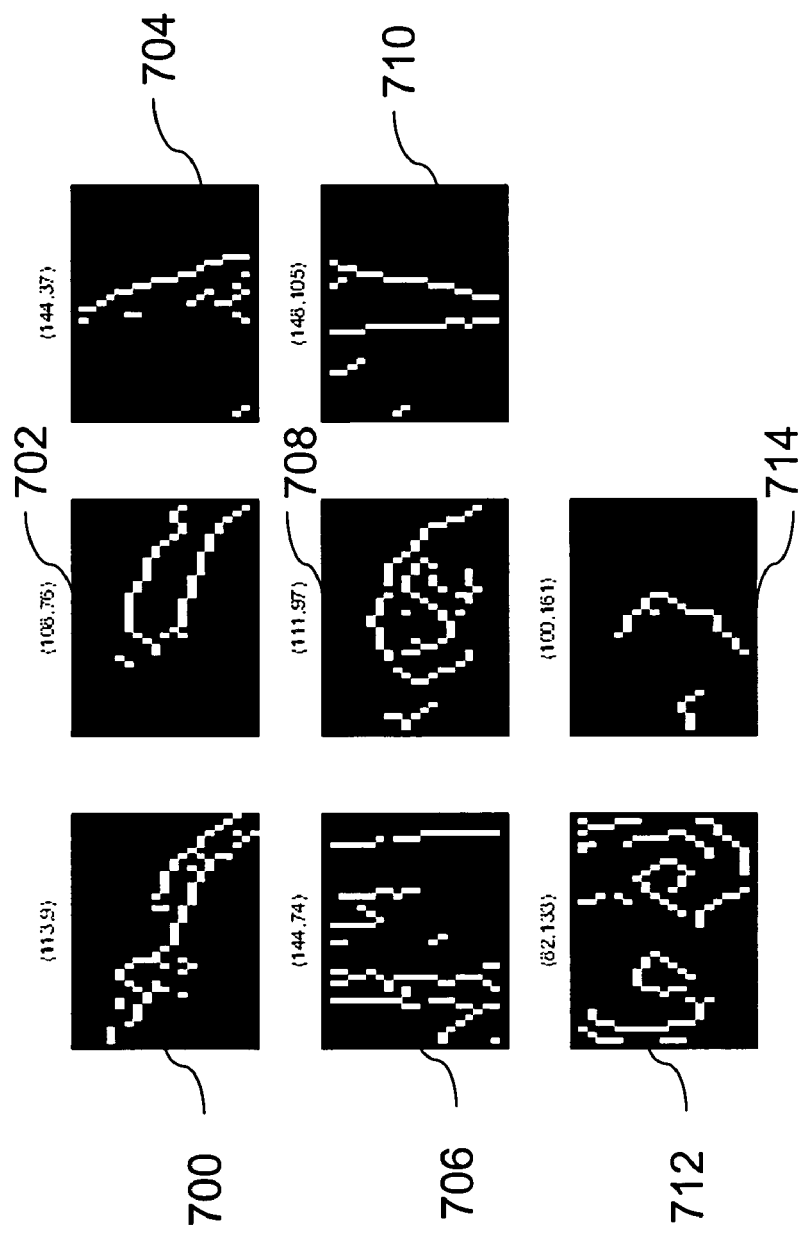
FIG. 7 is an image depicting the shape of the significant image attributes around the features extracted from the uncalibrated frontal camera view of a face.
Figure 8:
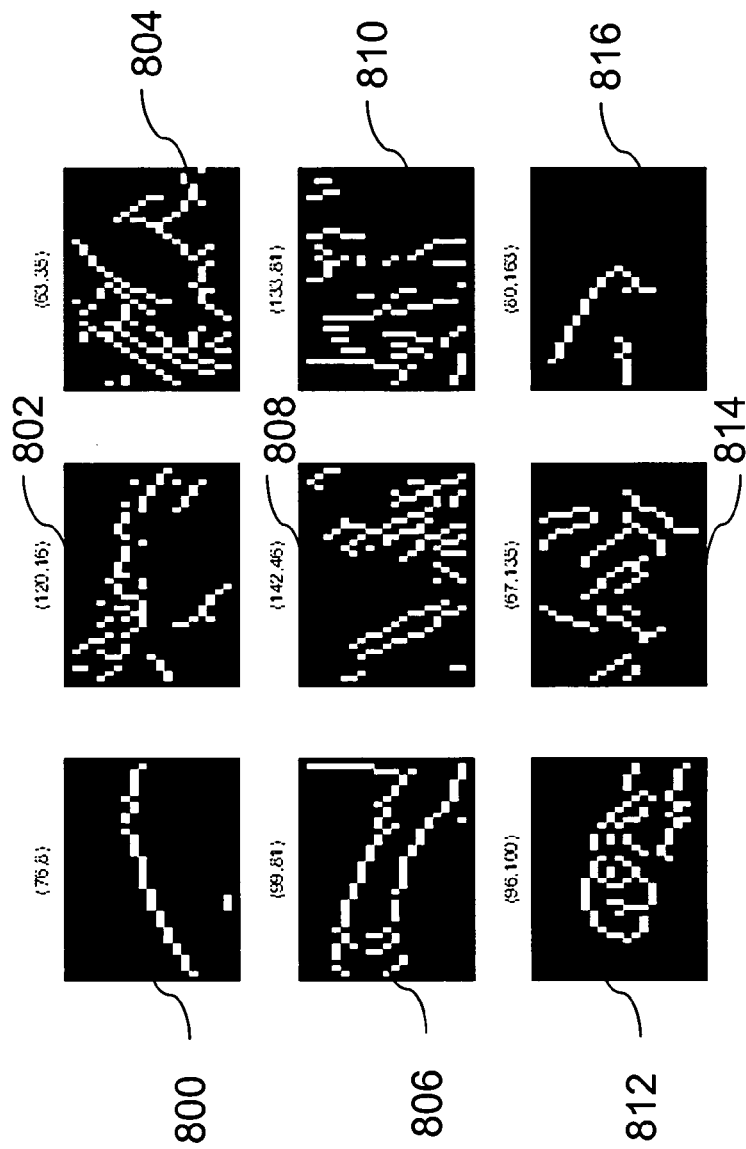
FIG. 8 is an image depicting the shape of the significant image attributes around the features extracted from the uncalibrated sidewise camera view of a face.

FIG. 7 depicts plots of the outputs obtained by the corner-finder algorithm representing a two-dimensional (2D) shape around each of the feature points extracted and plotted in FIG. 5, correspondingly; where the images 700, 702, 704, 706, 708, 710, 712, and 714 correspond to the shape of the significant image attributes around the features extracted from the uncalibrated frontal camera view of the face. FIG. 8 depicts plots of the outputs obtained by the corner-finder algorithm representing a two-dimensional (2D) shape around each of the feature points extracted and plotted in FIG. 6, correspondingly; where the images 800, 802, 804, 806, 808, 810, 812, 814, and 816 correspond to shapes of the significant image attributes around the features extracted from the uncalibrated sidewise camera view of the face.

Figure 9:
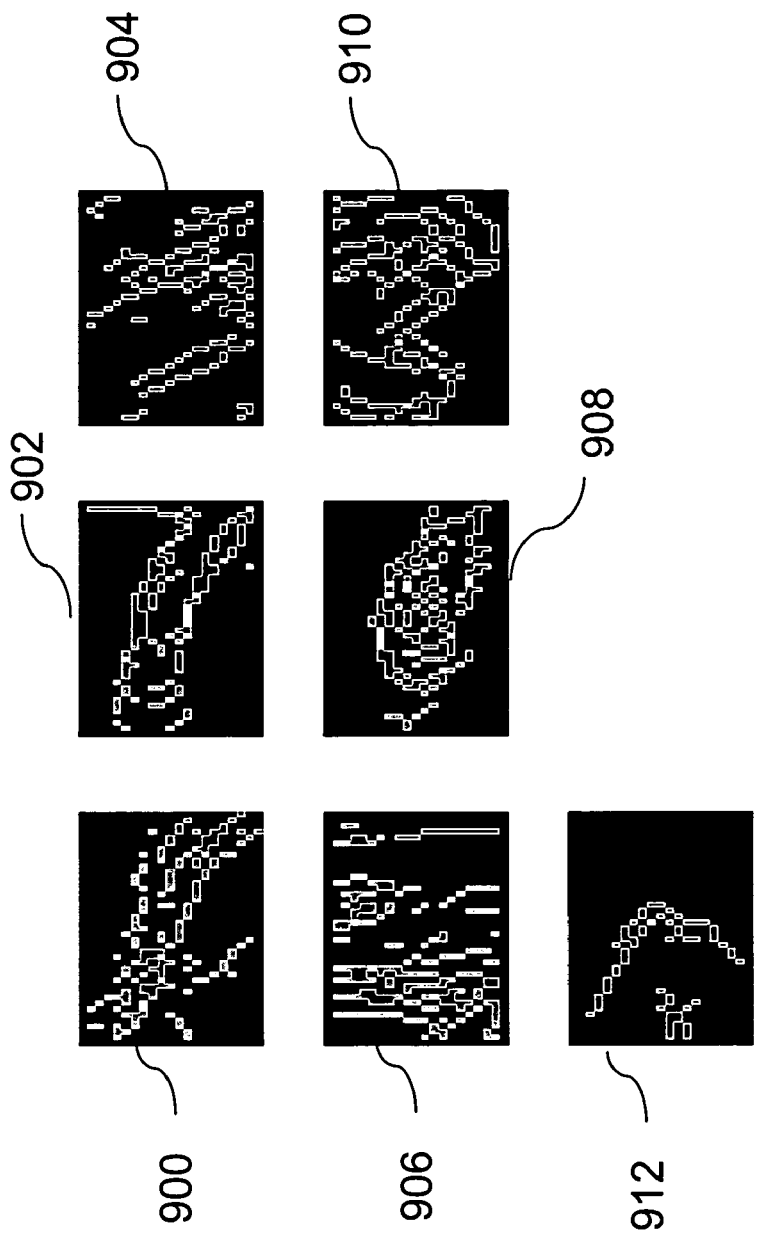
FIG. 9 is an image depicting the shape representation averaged over a large number of viewing angles of the significant image attributes around features extracted from pre-computed prior information describing a face.

FIG. 9 is a set of images depicting the shape representation averaged over a large number of viewing angles (i.e. mean features) of the significant image attributes around face features extracted from pre-computed prior information describing a face, where the images 900, 902, 904, 906, 908, 910, and 912 correspond to mean features around distinct face features extracted by an embodiment of the invention from pre-computed prior information. The prior information was collected by tracking a set of face features across multiple frames (multiple views) in video sequences, where the video sequences were captured from uncalibrated camera locations of three subjects, and then the embodiment averaged their responses.

Estimation of Posterior Probabilities

Figure 10:
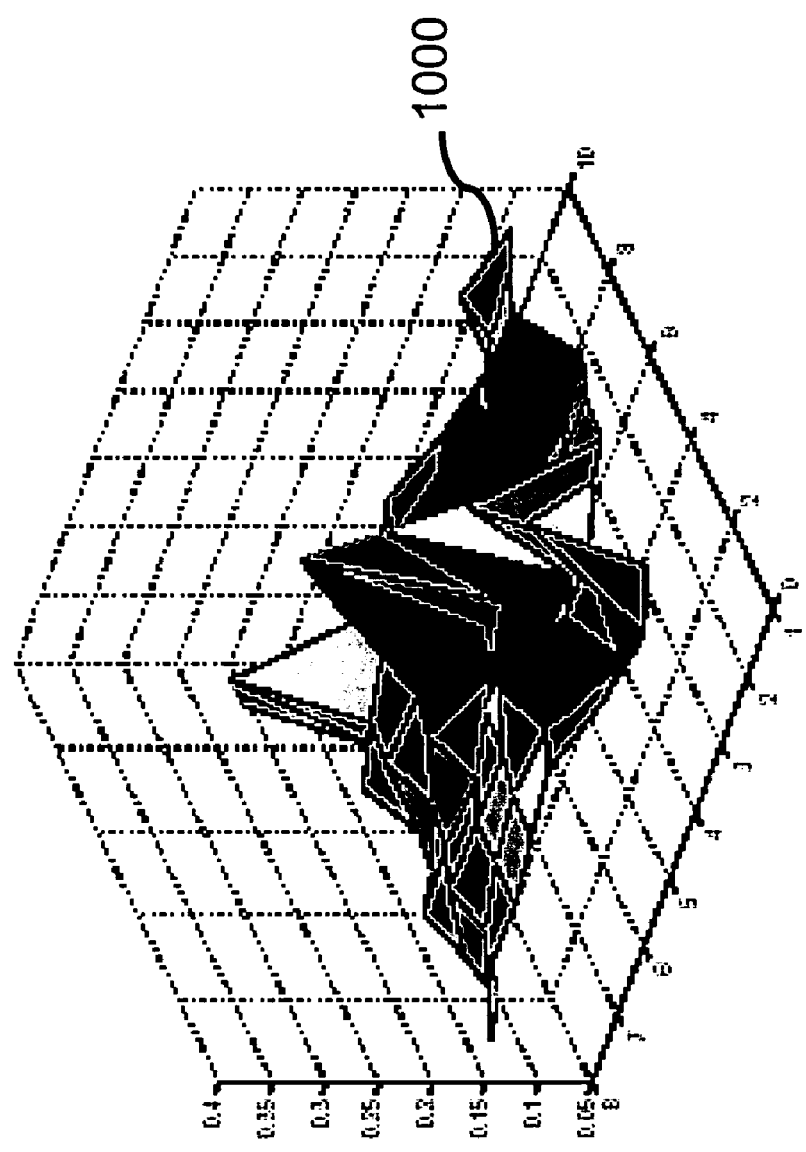
FIG. 10 is an image depicting a graphical representation of an a posteriori correspondence matrix.

FIG. 10 is a graphical representation 1000 of the posterior probability matrix P(X,Y) obtained by the embodiment of the invention before applying the Sinkhorn normalization procedure. It can be seen that there is a distinct peak for each row and column of the matrix, corresponding to a pair of features matching with each other. The valleys of this surface plot, representing rows or columns with no peaks, correspond to unmatched pairs of features, "unpaired features."

Figure 11:
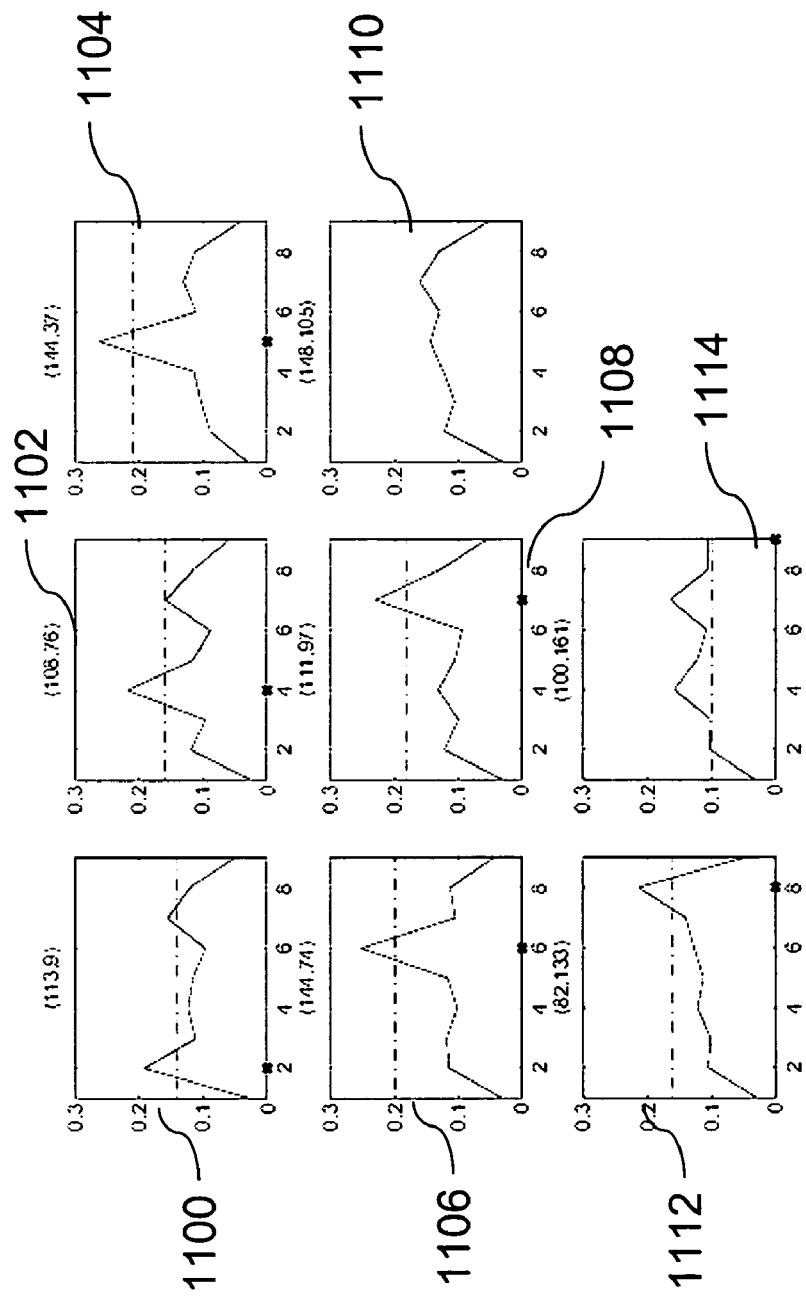
FIG. 11 is an image depicting a posteriori probabilities for each of the features extracted from the uncalibrated frontal camera view of the face; wherein the a posteriori probabilities were obtained from each of the rows of the a posteriori correspondence matrix.
Figure 12:
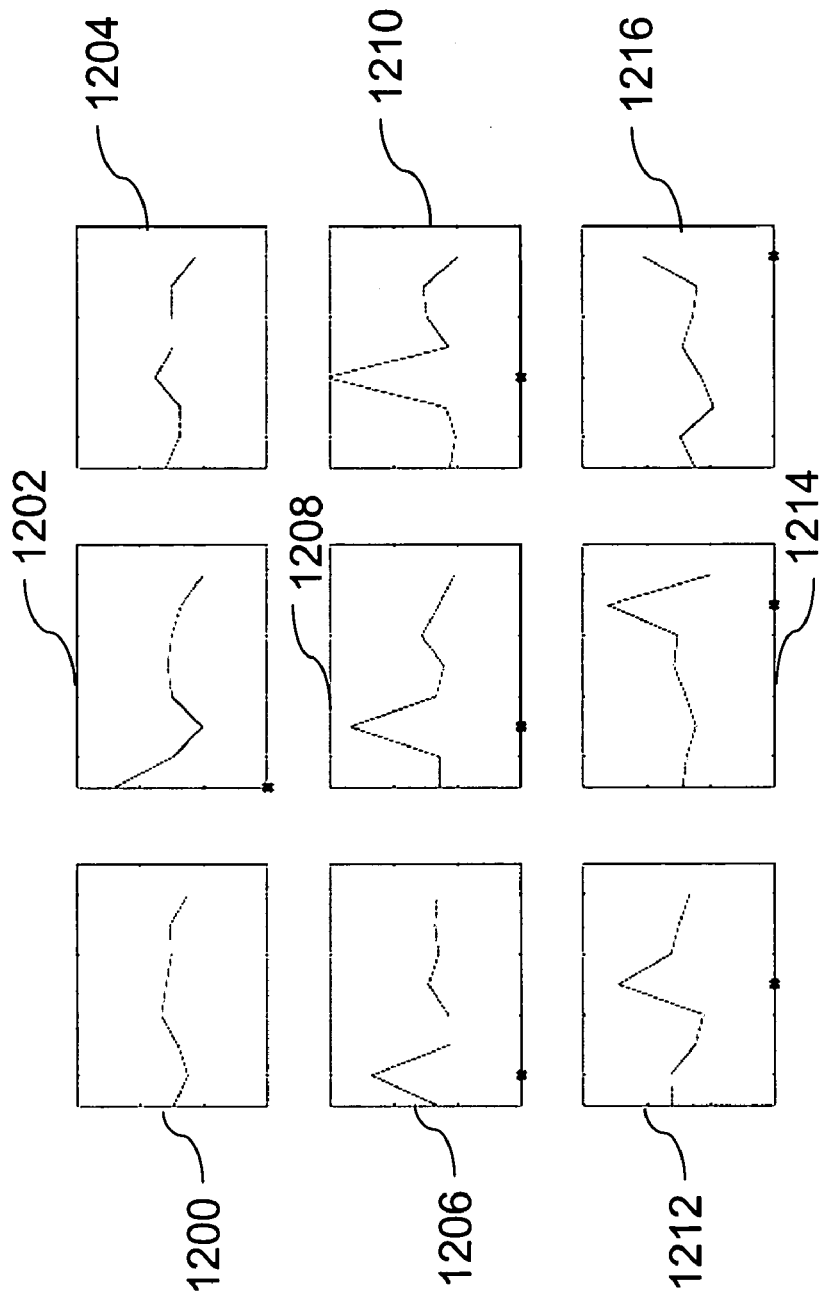
FIG. 12 is an image depicting a posteriori probabilities for each of the features extracted from the uncalibrated frontal camera view of the face; wherein the a posteriori probabilities were obtained from each of the columns of the a posteriori correspondence matrix.

FIG. 11 is an image depicting a posteriori probabilities for each of the features extracted from the uncalibrated frontal camera view of the face, wherein the a posteriori probabilities were obtained from each of the rows of the a posteriori correspondence matrix shown in FIG. 10, where the images 1100, 1102, 1104, 1106, 1108, 1110, 1112, and 1114 correspond to the plot of the rows of the correspondence matrix, respectively. FIG. 12 is an image depicting a posteriori probabilities for each of the features extracted from the uncalibrated frontal camera view of the face, where the a posteriori probabilities were obtained from each of the columns of the a posteriori correspondence matrix shown in FIG. 10, where the images 1200, 1202, 1204, 1206, 1208, 1210, 1212, 1214, and 1216 correspond to the plot of the columns of the correspondence matrix, respectively. The true values (as obtained by a manual operator) are marked by a * on the horizontal axis of FIG. 11 and FIG. 12, except for those features which are unmatched.

Matching the Spatial Arrangement of Features

Figure 13:
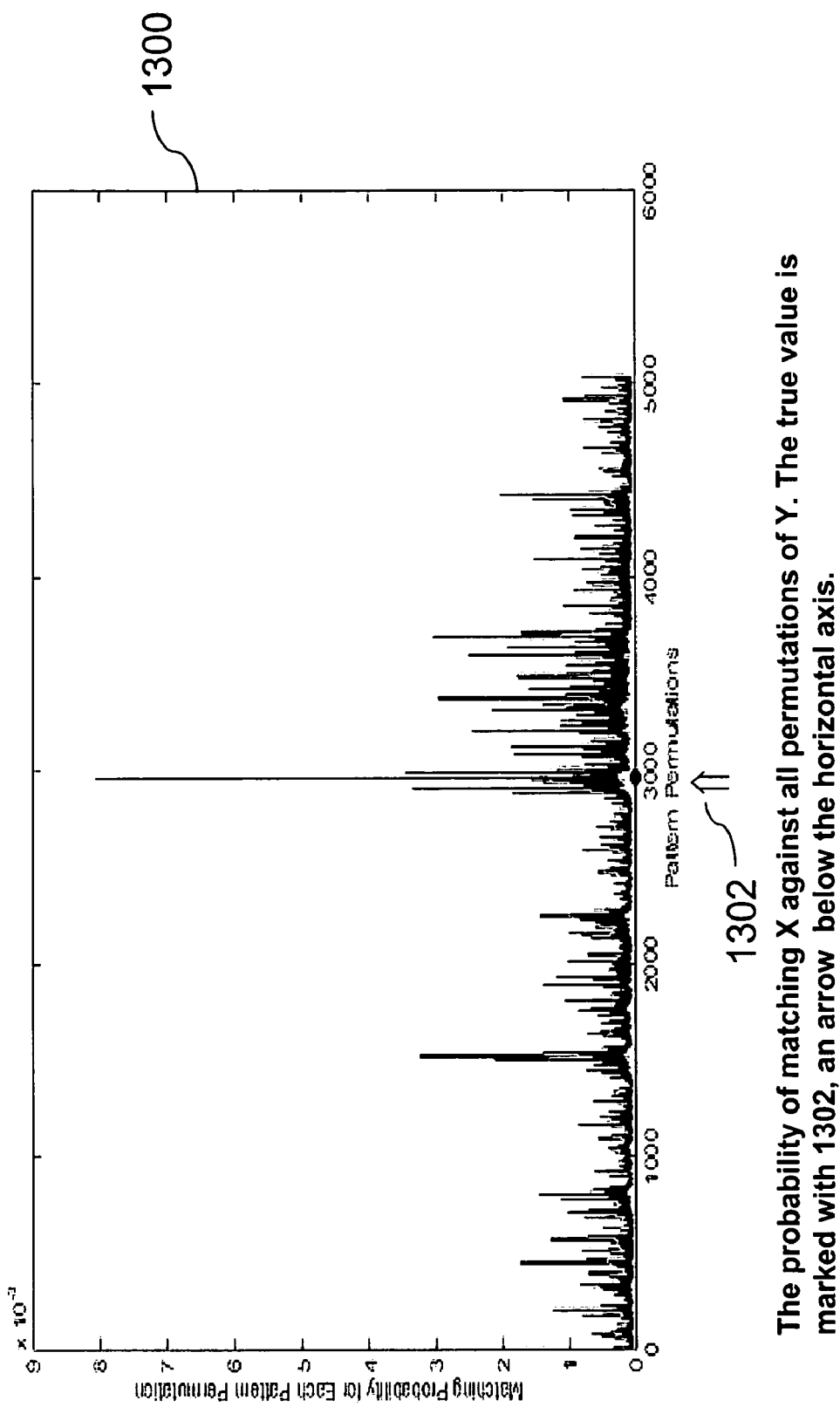
FIG. 13 is a plot of results obtained using the present invention; wherein the plot illustrates the probability of matching a feature set X against all permutations of features in another feature set Y for the case when prior information about the scene is available a priori.
Figure 14:
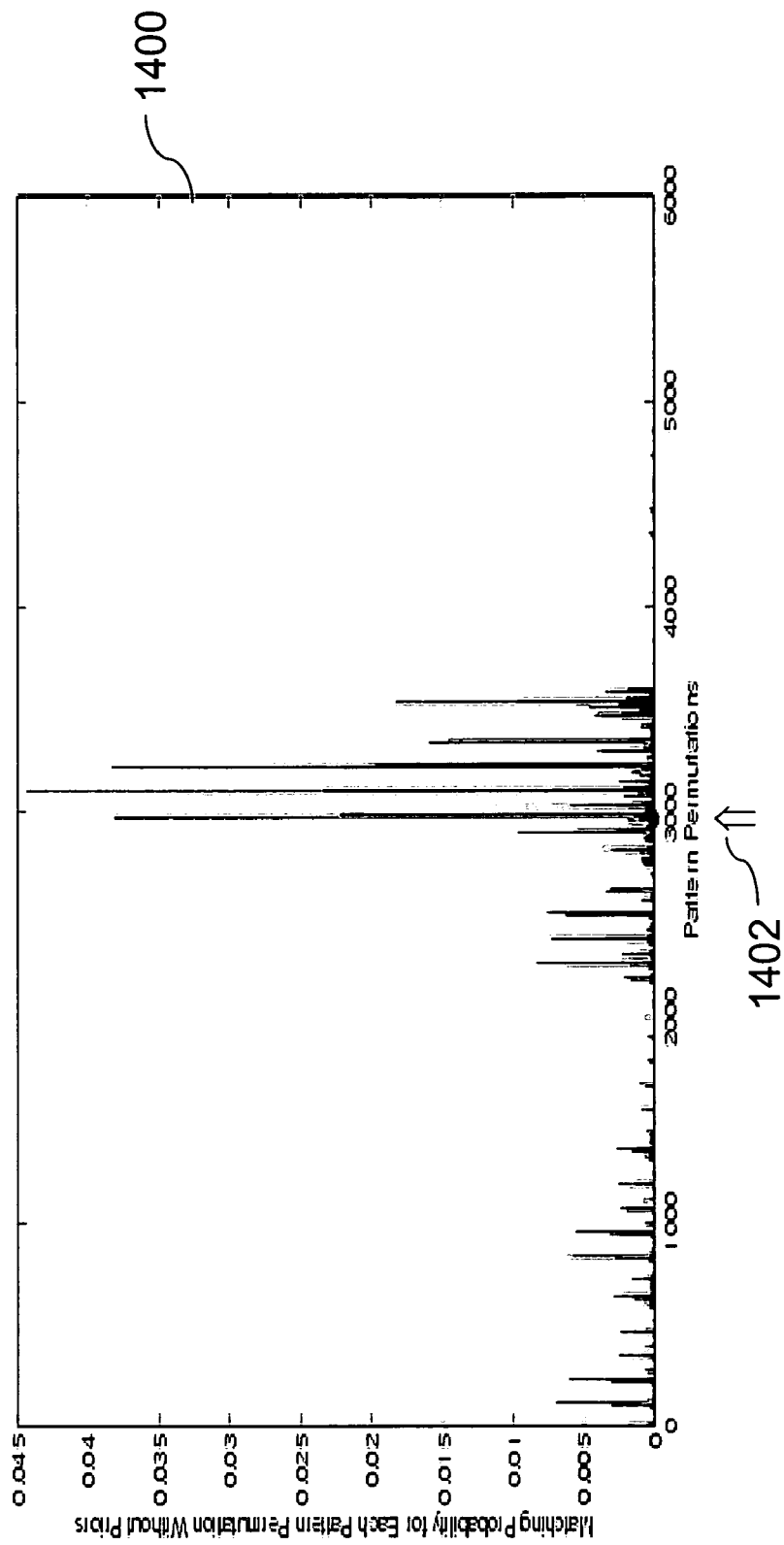
FIG. 14 is a plot of results obtained using the present invention; wherein the plot illustrates the probability of matching a feature set X against all permutations of features in another feature set Y for the case when prior information about the scene is not available a priori.

FIG. 13 plots the results obtained using the present invention, wherein the plot 1300 illustrates the probability of matching a feature set X against all permutations of features in another feature set Y for the case when prior information about the scene is available a priori. The true value of the best match between features is marked with an arrow 1302 placed on the horizontal axis of the plot. FIG. 14 plots the features without the advantage of the prior information, thus FIG. 14 plots the results obtained using the present invention for the case when prior information about the scene is not available a priori. The plot 1400, in FIG. 14, illustrates the probability of matching a feature set X against all permutations of features in another feature set Y for the case when prior information is not available. The true value of the best match between features is marked with an arrow 1402 placed on the horizontal axis of the plot.

There is a very distinct peak in the plot of FIG. 13, indicating a very strong match between two features, as opposed to the plotted results obtained in FIG. 14, where there are three high peaks indicating three possible matches between the feature set X against all permutations of features in the feature set Y for the case when prior information is not available. Therefore, this embodiment yields to a more robust correpondence algorithm, eliminating ambiguities of match between features by incorporating prior information about a scene or an object to the matching scheme of the embodiment, and by taking into account the spatial arrangement of the features by finding the "spatially local persistent feature groupings" from the uncalibrated views captured at multiple uncalibrated image capturing device locations.

Figure 15:
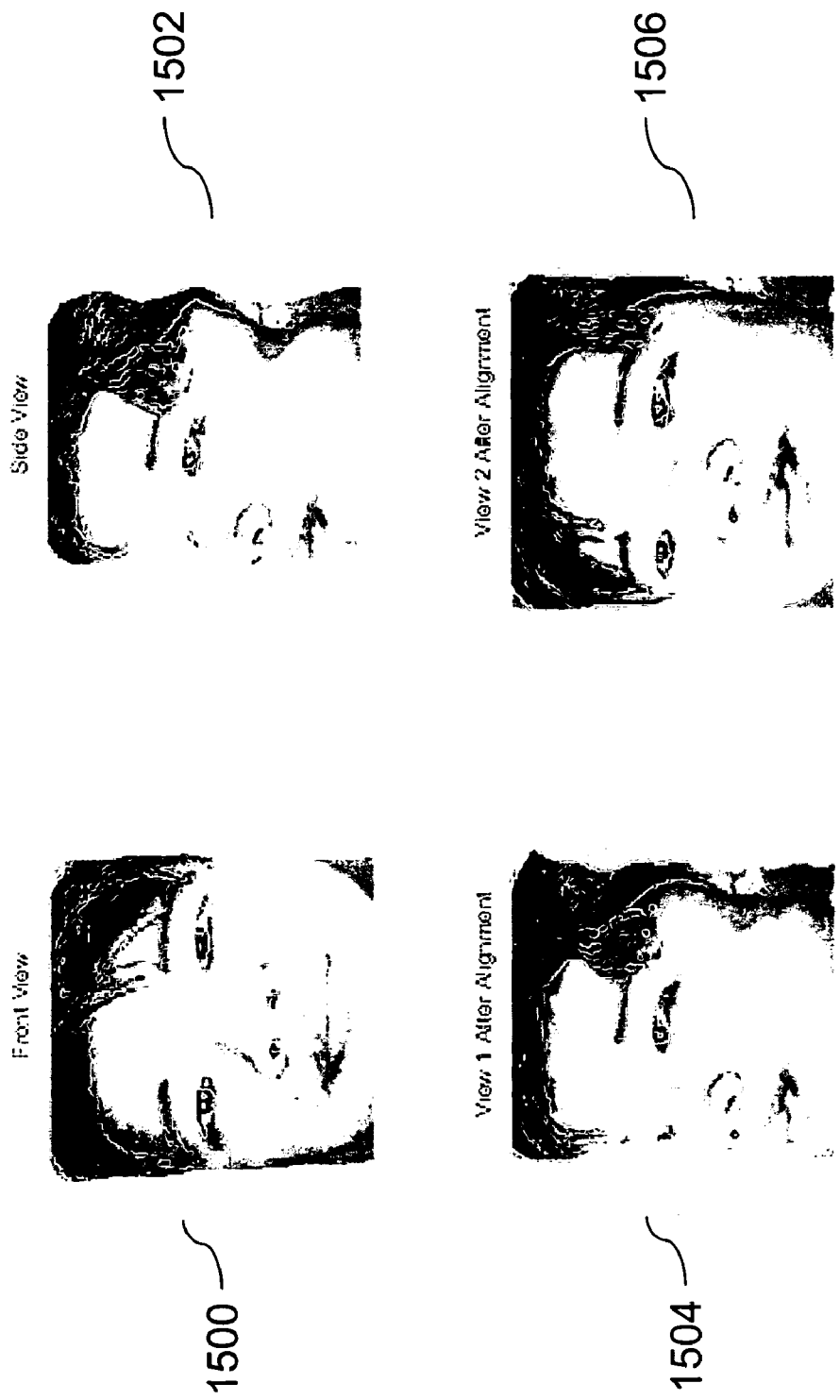
FIG. 15 is an image depicting three-dimensional models obtained using the present invention; wherein the image illustrates a three-dimensional model of a face obtained from uncalibrated frontal camera views, a three-dimensional model of the face obtained from uncalibrated sidewise camera views, and two overall three-dimensional models of the face obtained by stitching together the three-dimensional model from the uncalibrated frontal camera view and the three-dimensional model from the uncalibrated sidewise camera view.

FIG. 15 is an image depicting three-dimensional models obtained using the present invention, where images 1500 and 1502 are two distinct three dimensional structures modeling a face outputted from the "forming a three-dimensional model from an uncalibrated image capturing device location" portion of the invention, and images 1504 and 1506 are two distinct overall three dimensional models of at least a portion of a face outputted from the "stitching together the three-dimensional models from multiple uncalibrated image capturing device locations" make sure only one space portion of the invention.

Therefore, the image 1500 illustrates a three-dimensional model of a face obtained from uncalibrated frontal camera views; the image 1502 illustrates a three-dimensional model of the face obtained from uncalibrated sidewise camera views; the image 1504 illustrates an overall three-dimensional model of the face obtained by stitching together the three-dimensional model from the uncalibrated sidewise camera view 1502 and the three-dimensional model from the uncalibrated frontal camera view 1500; and the image 1506 illustrates an overall three-dimensional model of the face obtained by stitching together the three-dimensional model from the uncalibrated frontal camera view 1500 and the three-dimensional model from the uncalibrated sidewise camera view 1502.

Advantages of the Invention

A system for generating three-dimensional models from image streams from still imagery or video streams from uncalibrated views, is presented. A detailed embodiment of the present invention enables a user to generate a three-dimensional model of at least a portion of a scene from multiple uncalibrated views of an uncalibrated image capturing device location. In addition, the detailed embodiment enables a user to stitch together the three-dimensional models viewed from the subset of the uncalibrated image capturing device locations, without the user having to manually register some "points in common" between the 3D models prior to attempting to stitch them together.

The previously described embodiments of the present invention have many advantages, including: generating overall three-dimensional models from still imagery or video streams from uncalibrated views captured from multiple uncalibrated image capturing device locations; the ability to automatically align the 3D models to be stitched together without the need of manually approximately registering "points in common" between the models, thus requiring minimum or little human intervention; exploiting the prior information available about a scene or an object in order to generate a robust matching scheme which supports the detection of missing features and occlusions between views; employing a "global" matching strategy that emphasizes the "structural description" of a scene or an object within a model which leads to a robust matching strategy, as opposed to using a local matching strategy that only establishes correspondence between the individual features within a local region in a model; and dealing effectively with imagery of rigid objects, non-rigid objects, and complex scenes containing both rigid and non-rigid objects captured from uncalibrated views captured from an array of multiple uncalibrated image capturing devices. Furthermore, the present invention does not require that all the advantageous features and all the advantages need to be incorporated into every embodiment of the invention.

Although the present invention has been described in considerable detail with reference to certain embodiments thereof, other embodiments are possible. For example, other feature extraction algorithms can be used to extract the features from the images from uncalibrated image capturing device location; other techniques for computing correspondence between features and correspondence between sets of feature groupings may be used; the system can use several algorithms to create the three-dimensional models from the uncalibrated views, other than the "structure from motion" algorithm, the Ransac robust estimation algorithm, and the Sinkhorn normalization process; and further the present invention can be used to generate three-dimensional models or two-dimensional models (mosaics) from calibrated views captured with calibrated image capturing devices. Therefore, the spirit and scope of the appended claims should not be limited to the description of the embodiments contained herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

What is claimed is:

1. A method for generating three-dimensional models from uncalibrated views comprising acts of:
   forming a three-dimensional model of at least a portion of a scene viewed from an uncalibrated image capturing device location by:
   receiving images from uncalibrated views of the uncalibrated image capturing device location;
   extracting features from the images from uncalibrated views of the uncalibrated image capturing device location;
   computing correspondence between features from images from the uncalibrated views captured from the uncalibrated image capturing device location;
   forming a three-dimensional structure modeling the at least a portion of a scene viewed from the uncalibrated image capturing device location;
   iteratively performing the act of forming a three-dimensional model viewed from an uncalibrated image capturing device location, for a subset of the uncalibrated image capturing device locations available;
   stitching together the three-dimensional models viewed from the subset of the uncalibrated image capturing device locations by:
   finding spatially local persistent feature groupings from the uncalibrated views captured at an uncalibrated image capturing device location;
   iteratively performing the act of finding spatially local persistent feature groupings for a subset of the uncalibrated image capturing device locations available;
   computing correspondence between sets of feature groupings from two uncalibrated image capturing device locations for a subset of pair-wise combinations of uncalibrated image capturing device locations;

searching for best matches, whereby multiple three-dimensional models from a subset of uncalibrated image capturing device locations are thus "stitched" together to form an overall three-dimensional model of at least a portion of a scene; and outputting the overall three-dimensional model of at least a portion of a scene.

2. A method for generating three-dimensional models from uncalibrated views as set forth in claim 1, wherein in the act of receiving images from uncalibrated views, the images are obtained using at least one uncalibrated image capturing device selected from a group consisting of a still camera, a video camera, a Magnetic Resonance Imaging (MRI) recording mechanism, an ultrasound recording apparatus, an external computer connected to the system, an internet connection, an internet web camera, a direct satellite link, a video cassette recorder (VCR), a digital versatile disc (DVD) player, and imaging recording media used to gather snapshots of a desired portion of a scene at multiple uncalibrated views, the imaging recording media selected from a group consisting of a Compact Disk (CD), a Digital Versatile Disk/Digital Video Disk (DVD), a floppy disk, a magnetic tape, a removable hard drive, a printed picture, a scanned document, a faxed document, a digital camera, a video cassette, a Magnetic Resonance Imaging (MRI) recording media, an ultrasound recording media, and a solid-state recording media.

3. A method for generating three-dimensional models from uncalibrated views as set forth in claim 2, wherein the images from uncalibrated views are generated from a group consisting of: images generated by a single uncalibrated image capturing device viewing at least a portion of a scene at multiple pan and tilt settings; images captured with multiple uncalibrated image capturing devices viewing at least a portion of a scene; and images generated by multiple uncalibrated image capturing devices viewing at least a portion of a scene at multiple pan and tilt settings.

4. A method for generating three-dimensional models from uncalibrated views as set forth in claim 3, wherein a portion of a scene comprises at least one object, and wherein the images from uncalibrated views are formed from a group consisting of: images containing overlapping views of a portion of a scene, images containing partially overlapping views of a portion of a scene, images containing slightly overlapping views of a portion of a scene, and images containing non-overlapping views of a portion of a scene.

5. A method for generating three-dimensional models from uncalibrated views as set forth in claim 4, further comprising a act of identifying and eliminating unpaired features prior to computing correspondence between features and computing correspondence between sets of feature groupings.

6. A method for generating three-dimensional models from uncalibrated views as set forth in claim 5, wherein in the act of extracting features from the images, the features include at least one of: corner features, high entropy points, local edge features, and contour features.

7. A method for generating three-dimensional models from uncalibrated views as set forth in claim 6, wherein the correspondence between features and the correspondence between sets of feature groupings are computed by using a technique selected from a group consisting of: probabilistic matching, correlation measure, chi-square statistical measure, and dot product of feature vectors.

8. A method for generating three-dimensional models from uncalibrated views as set forth in claim 7, wherein in the act of forming a three-dimensional structure from the uncalibrated image capturing device location, the three-dimensional structure is formed by a "structure from motion" algorithm, where motion from the uncalibrated image capturing device is computed from the correspondence established from the images of uncalibrated views captured at different pan-tilt settings of the uncalibrated image capturing device location, and where the "structure from motion" algorithm simulates a three-dimensional structure modeling at least a portion of a scene from the motion of the uncalibrated image capturing device.

9. A method for generating three-dimensional models from uncalibrated views as set forth in claim 8, wherein the correspondence between features and the correspondence between sets of feature groupings are computed using a probabilistic matching method, where the probabilistic matching method computes probabilities of match between features by using prior information representing a portion of a scene, and where the probabilities of match between features correspond to a posteriori probabilities.

10. A method for generating three-dimensional models from uncalibrated views as set forth in claim 9, wherein in the act of identifying and eliminating unpaired features, two unpaired features are identified by computing and plotting an a posteriori probability relating both features, wherein the a posteriori probability relating both features has a flat profile when the two features are unpaired.

11. A method for generating three-dimensional models from uncalibrated views as set forth in claim 10, wherein the a posteriori probabilities are used to form a correspondence matrix, where a one-to-one correspondence between feature groupings from two uncalibrated image capturing device locations is established by maximizing the correspondence matrix.

12. A method for generating three-dimensional models from uncalibrated views as set forth in claim 11, wherein a Sinkhorn normalization process is used to form the correspondence matrix.

13. A method for generating three-dimensional models from uncalibrated views as set forth in claim 12, wherein in the act of searching for the best matches, a Ransac robust estimation algorithm is used to find peaks on the correspondence matrix, wherein the peaks on the correspondence matrix indicate where the three-dimensional models from the uncalibrated image capturing device locations are to be stitched together.

14. A method for generating three-dimensional models from uncalibrated views as set forth in claim 13, wherein the a posteriori probability, $P(H_i|X)$, is defined by $$P(H_i \mid X) = \sum_{k=1}^{K} P(H_i \mid X, \xi_{X,\mu_k}) P(\xi_{X,\mu_j} \mid X = X_n)$$

where $X=[X_1, \ldots, X_N]$ and $Y=[Y_1, \ldots, Y_M]$ denote two sets of features extracted from two images from uncalibrated views; wherein a total of N features were extracted from an uncalibrated view, and a total of M features were extracted from another uncalibrated view;

$\mu = \mu_1, \ldots, \mu_K$ represent a set of features extracted from prior information, wherein a total of K features were extracted from prior information of the portion of the scene;

$H_i$ denotes a hypothesis that a feature $Y_i$ matches the set of features X, wherein i is a variable index with an integer value between 1 and M, and wherein i denotes an $i^{th}$ feature within the set of features Y;

$\xi_{X,\mu_j}$ denotes an event that {X matches $\mu_j$}, wherein j is a variable index with an integer value between 1 and K, and wherein j denotes a $j^{th}$ feature within the set of prior features $\mu$;

$P(\xi_{X,\mu_j}|X=X_n)$ denotes a probability of the set of features X matching a prior information feature $\mu_j$ given that the set of features X consists of a feature $X_n$, wherein n is a variable index with an integer value chosen between 1 and N, and wherein n denotes a $n^{th}$ feature within the set of features X;

$P(H_i|X,\xi_{X,\mu_j})$ denotes a probability of a feature $Y_i$ matching the set of features X given an event $\xi_{X,\mu_j}$ occurred (i.e. the set of features X matches the prior information feature $\mu_j$); wherein i denotes the $i^{th}$ feature within the set of features Y and j denotes the $j^{th}$ feature within the set of prior features $\mu$;

and wherein the probability of the set of features X matching the prior information feature $\mu_j$, $P(\xi_{X,\mu_j}|X=X_n)$, and the probability of a feature $Y_i$ matching the set of features X given an event $\xi_{X,\mu_j}$ occurred, $P(H_i|X,\xi_{X,\mu_j})$ are defined by $$P(\xi_{X,\mu_j} \mid X = X_n) = \frac{1}{\sum_{k=1}^{K} <X_n, \mu_k>} <X_n, \mu_j>$$

and $$P(H_i \mid X, \xi_{X,\mu_j}) = \frac{1}{\sum_{k=1}^{K} E<Y_i, \mu_k>} <Y_i, \mu_j>$$

where

E denotes a probabilistic expectation measure, and <.> denotes an inner product, where the inner product represents a measure of similarity.

15. A method for generating three-dimensional models from uncalibrated views as set forth in claim 14, wherein in the act of outputting the overall three-dimensional model, the outputting device is selected from a group consisting of at least one of: a computer monitor, a video camera connected to a computer, and a computer readable media used to display the overall three-dimensional model of a portion of a scene, the computer readable media selected from a group consisting of an imaging Compact Disk (CD), a Digital Versatile Disk/Digital Video Disk (DVD), a floppy disk, a removable hard drive, a video cassette, and a solid-state recording media.

16. A method for generating three-dimensional models from uncalibrated views as set forth in claim 1, wherein the images from uncalibrated views are generated from a group consisting of: images generated by a single uncalibrated image capturing device viewing at least a portion of a scene at multiple pan and tilt settings; images captured with multiple uncalibrated image capturing devices viewing at least a portion of a scene; and images generated by multiple uncalibrated image capturing devices viewing at least a portion of a scene at multiple pan and tilt settings.

17. A method for generating three-dimensional models from uncalibrated views as set forth in claim 1, wherein a portion of a scene comprises at least one object, and wherein the images from uncalibrated views are formed from a group consisting of: images containing overlapping views of a portion of a scene, images containing partially overlapping views of a portion of a scene, images containing slightly overlapping views of a portion of a scene, and images containing non-overlapping views of a portion of a scene.

18. A method for generating three-dimensional models from uncalibrated views as set forth in claim 1, further comprising a act of identifying and eliminating unpaired features prior to computing correspondence between features and computing correspondence between sets of feature groupings.

19. A method for generating three-dimensional models from uncalibrated views as set forth in claim 1, wherein in the act of extracting features from the images, the features include at least one of: corner features, high entropy points, local edge features, and contour features.

20. A method for generating three-dimensional models from uncalibrated views as set forth in claim 1, wherein in the act of forming a three-dimensional structure from the uncalibrated image capturing device location, the three-dimensional structure is formed by a "structure from motion" algorithm, where motion from the uncalibrated image capturing device is computed from the correspondence established from the images of uncalibrated views captured at different pan-tilt settings of the uncalibrated image capturing device location, and where the "structure from motion" algorithm simulates a three-dimensional structure modeling at least a portion of a scene from the motion of the uncalibrated image capturing device.

21. A method for generating three-dimensional models from uncalibrated views as set forth in claim 1, wherein the correspondence between features and the correspondence between sets of feature groupings are computed by using a technique selected from a group consisting of: probabilistic matching, correlation measure, chi-square statistical measure, and dot product of feature vectors.

22. A method for generating three-dimensional models from uncalibrated views as set forth in claim 1, wherein the correspondence between features and the correspondence between sets of feature groupings are computed using a probabilistic matching method, where the probabilistic matching method computes probabilities of match between features by using prior information representing a portion of a scene, and where the probabilities of match between features correspond to a posteriori probabilities.

23. A method for generating three-dimensional models from uncalibrated views as set forth in claim 22, wherein in the act of identifying and eliminating unpaired features, two unpaired features are identified by computing and plotting an a posteriori probability relating both features, wherein the a posteriori probability relating both features has a flat profile when the two features are unpaired.

24. A method for generating three-dimensional models from uncalibrated views as set forth in claim 23, wherein the a posteriori probabilities are used to form a correspondence matrix, where a one-to-one correspondence between feature groupings from two uncalibrated image capturing device locations is established by maximizing the correspondence matrix.

25. A method for generating three-dimensional models from uncalibrated views as set forth in claim 22, wherein the a posteriori probability, $P(H_i|X)$, is defined by $$P(H_i \mid X) = \sum_{k=1}^{K} P(H_i \mid X, \xi_{X,\mu_k}) P(\xi_{X,\mu_j} \mid X = X_n)$$

where
   $X=[X_1, \ldots, X_N]$ and $Y=[Y_1, \ldots, Y_M]$ denote two sets of features extracted from two images from uncalibrated views; wherein a total of N features were extracted from an uncalibrated view, and a total of M features were extracted from another uncalibrated view;
   $\mu=\mu_1, \ldots, \mu_K$ represent a set of features extracted from prior information, wherein a total of K features were extracted from prior information of the portion of the scene;
   $H_i$ denotes a hypothesis that a feature $Y_i$ matches the set of features X, wherein i is a variable index with an integer value between 1 and M, and wherein i denotes an $i^{th}$ feature within the set of features Y;
   $\xi_{X\mu_j}$ denotes an event that $\{X$ matches $\mu_j\}$, wherein j is a variable index with an integer value between 1 and K, and wherein j denotes a $j^{th}$ feature within the set of prior features $\mu$;
   $P(\xi_{X,\mu_j}|X=X_n)$ denotes a probability of the set of features X matching a prior information feature $\mu_j$ given that the set of features X consists of a feature $X_n$, wherein n is a variable index with an integer value chosen between 1 and N, and wherein n denotes a $n^{th}$ feature within the set of features X;
   $P(H_i|X,\xi_{X,\mu_j})$ denotes a probability of a feature $Y_i$ matching the set of features X given an event $\xi_{X\mu_j}$ occurred (i.e. the set of features X matches the prior information feature $\mu_j$); wherein i denotes the $i^{th}$ feature within the set of features Y and j denotes the $j^{th}$ feature within the set of prior features $\mu$;
and wherein the probability of the set of features X matching the prior information feature $\mu_j$, $P(\xi_{X,\mu_j}|X=X_n)$, and the probability of a feature $Y_i$ matching the set of features X given an event $\xi_{X\mu_j}$ occurred, $P(H_i|X,\xi_{X,\mu_j})$, are defined by $$P(\xi_{X,\mu_j} \mid X = X_n) = \frac{1}{\sum_{k=1}^{K} <X_n, \mu_k>} <X_n, \mu_j>$$

and $$P(H_i \mid X, \xi_{X,\mu_j}) = \frac{1}{\sum_{k=1}^{K} <Y_i, \mu_k>} <Y_i, \mu_j>$$

where
   E denotes a probabilistic expectation measure, and <. > denotes an inner product, where the inner product represents a measure of similarity.

26. A method for generating three-dimensional models from uncalibrated views as set forth in claim 1, wherein a Sinkhorn normalization process is used to form the correspondence matrix.

27. A method for generating three-dimensional models from uncalibrated views as set forth in claim 1, wherein in the act of searching for the best matches, a Ransac robust estimation algorithm is used to find peaks on the correspondence matrix, wherein the peaks on the correspondence matrix indicate where the three-dimensional models from the uncalibrated image capturing device locations are to be stitched together.

28. A method for generating three-dimensional models from uncalibrated views as set forth in claim 1, wherein in the act of outputting the overall three-dimensional model, the outputting device is selected from a group consisting of at least one of: a computer monitor, a video camera connected to a computer, and a computer readable media used to display the overall three-dimensional model of a portion of a scene, the computer readable media selected from a group consisting of an imaging Compact Disk (CD), a Digital Versatile Disk/Digital Video Disk (DVD), a floppy disk, a removable hard drive, a video cassette, and a solid-state recording media.

29. A system for generating three-dimensional models from uncalibrated views, the system comprising:
   a computer system including a processor, a memory coupled with the processor, an input coupled with the processor for receiving images from uncalibrated views of an uncalibrated image capturing device location, the computer system further comprising means, residing in its processor and memory for:
      forming a three-dimensional model of at least a portion of a scene viewed from an uncalibrated image capturing device location by:
         extracting features from the images from uncalibrated views of the uncalibrated image capturing device location;
         computing correspondence between features from images from the uncalibrated views captured from the uncalibrated image capturing device location;
         forming a three-dimensional structure modeling the at least a portion of a scene viewed from the uncalibrated image capturing device location;
      iteratively performing the means for forming a three-dimensional model viewed from an uncalibrated image capturing device location, for a subset of the uncalibrated image capturing device locations available;
      stitching together the three-dimensional models viewed from the subset of the uncalibrated image capturing device locations by:
         finding spatially local persistent feature groupings from the uncalibrated views captured at an uncalibrated image capturing device location;
         iteratively performing the means for finding spatially local persistent feature groupings for a subset of the uncalibrated image capturing device locations available;
         computing correspondence between sets of feature groupings from two uncalibrated image capturing device locations for a subset of pair-wise combinations of uncalibrated image capturing device locations;
         searching for best matches, whereby multiple three-dimensional models from a subset of uncalibrated image capturing device locations are thus "stitched" together to form an overall three-dimensional model of at least a portion of a scene; and
      outputting the overall three-dimensional model of at least a portion of a scene.

30. A system for generating three-dimensional models from uncalibrated views as set forth in claim 29, wherein in the means for receiving images from uncalibrated views, the images are obtained using at least one uncalibrated image capturing device selected from a group consisting of a still camera, a video camera, a Magnetic Resonance Imaging (MRI) recording mechanism, an ultrasound recording apparatus, an external computer connected to the system, an internet connection, an internet web camera, a direct satellite link, a video cassette recorder (VCR), a digital versatile disc (DVD) player, and imaging recording media used to gather snapshots of a desired portion of a scene at multiple uncalibrated views, the imaging recording media selected from a group consisting of a Compact Disk (CD), a Digital Versatile Disk/Digital Video Disk (DVD), a floppy disk, a magnetic tape, a removable hard drive, a printed picture, a scanned document, a faxed document, a digital camera, a video cassette, a Magnetic Resonance Imaging (MRI) recording media, an ultrasound recording media, and a solid-state recording media.

31. A system for generating three-dimensional models from uncalibrated views as set forth in claim 30, wherein the images from uncalibrated views are generated from a group consisting of: images generated by a single uncalibrated image capturing device viewing at least a portion of a scene at multiple pan and tilt settings; images captured with multiple uncalibrated image capturing devices viewing at least a portion of a scene; and images generated by multiple uncalibrated image capturing devices viewing at least a portion of a scene at multiple pan and tilt settings.

32. A system for generating three-dimensional models from uncalibrated views as set forth in claim 31, wherein a portion of a scene comprises at least one object, and wherein the images from uncalibrated views are formed from a group consisting of: images containing overlapping views of a portion of a scene, images containing partially overlapping views of a portion of a scene, images containing slightly overlapping views of a portion of a scene, and images containing non-overlapping views of a portion of a scene.

33. A system for generating three-dimensional models from uncalibrated views as set forth in claim 32, further comprising a means for identifying and eliminating unpaired features prior to computing correspondence between features and computing correspondence between sets of feature groupings.

34. A system for generating three-dimensional models from uncalibrated views as set forth in claim 33, wherein in the means for extracting features from the images, the features include at least one of: corner features, high entropy points, local edge features, and contour features.

35. A system for generating three-dimensional models from uncalibrated views as set forth in claim 34, wherein the correspondence between features and the correspondence between sets of feature groupings are computed by using a technique selected from a group consisting of: probabilistic matching, correlation measure, chi-square statistical measure, and dot product of feature vectors.

36. A system for generating three-dimensional models from uncalibrated views as set forth in claim 35, wherein in the means for forming a three-dimensional structure from the uncalibrated image capturing device location, the three-dimensional structure is formed by a "structure from motion" algorithm, where motion from the uncalibrated image capturing device is computed from the correspondence established from the images of uncalibrated views captured at different pan-tilt settings of the uncalibrated image capturing device location, and where the "structure from motion" algorithm simulates a three-dimensional structure modeling at least a portion of a scene from the motion of the uncalibrated image capturing device.

37. A system for generating three-dimensional models from uncalibrated views as set forth in claim 36, wherein the correspondence between features and the correspondence between sets of feature groupings are computed using a probabilistic matching method, where the probabilistic matching method computes probabilities of match between features by using prior information representing a portion of a scene, and where the probabilities of match between features correspond to a posteriori probabilities.

38. A system for generating three-dimensional models from uncalibrated views as set forth in claim 37, wherein in the means for identifying and eliminating unpaired features, two unpaired features are identified by computing and plotting an a posteriori probability relating both features, wherein the a posteriori probability relating both features has a flat profile when the two features are unpaired.

39. A system for generating three-dimensional models from uncalibrated views as set forth in claim 38, wherein the a posteriori probabilities are used to form a correspondence matrix, where a one-to-one correspondence between feature groupings from two uncalibrated image capturing device locations is established by maximizing the correspondence matrix.

40. A system for generating three-dimensional models from uncalibrated views as set forth in claim 39, wherein a Sinkhorn normalization process is used to form the correspondence matrix.

41. A system for generating three-dimensional models from uncalibrated views as set forth in claim 40, wherein in the means for searching for the best matches, a Ransac robust estimation algorithm is used to find peaks on the correspondence matrix, wherein the peaks on the correspondence matrix indicate where the three-dimensional models from the uncalibrated image capturing device locations are to be stitched together.

42. A system for generating three-dimensional models from uncalibrated views as set forth in claim 41, wherein the a posteriori probability, $P(H_i|X)$, is defined by $$P(H_i \mid X) = \sum_{k=1}^{K} P(H_i \mid X, \xi_{X,\mu_k}) P(\xi_{X,\mu_j} \mid X = X_n)$$

where
- $X=[X_1, \ldots, X_N]$ and $Y=[Y_1, \ldots, Y_M]$ denote two sets of features extracted from two images from uncalibrated views; wherein a total of N features were extracted from an uncalibrated view, and a total of M features were extracted from another uncalibrated view;
- $\mu=\mu_1, \ldots, \mu_K$ represent a set of features extracted from prior information, wherein a total of K features were extracted from prior information of the portion of the scene;
- $H_i$ denotes a hypothesis that a feature $Y_i$ matches the set of features X, wherein i is a variable index with an integer value between 1 and M, and wherein i denotes an $i^{th}$ feature within the set of features Y;
- $\xi_{X,\mu_j}$ denotes an event that {X matches $\mu_j$}, wherein j is a variable index with an integer value between 1 and K, and wherein j denotes a $j^{th}$ feature within the set of prior features $\mu$;
- $P(\xi_{X,\mu_j}|X=X_n)$ denotes a probability of the set of features X matching a prior information feature $\mu_j$ given that the set of features X consists of a feature $X_n$, wherein n is a variable index with an integer value chosen between 1 and N, and wherein n denotes a $n^{th}$ feature within the set of features X;

$P(H_i|X,\xi_{X,\mu_j})$ denotes a probability of a feature $Y_i$ matching the set of features X given an event $\xi_{X,\mu_j}$ occurred (i.e. the set of features X matches the prior information feature $\mu_j$); wherein i denotes the $i^{th}$ feature within the set of features Y and j denotes the $j^{th}$ feature within the set of prior features $\mu$;

and wherein the probability of the set of features X matching the prior information feature $\mu_j$, $P(\xi_{X,\mu_j}|X=X_n)$, and the probability of a feature $Y_i$ matching the set of features X given an event $\xi_{X,\mu_j}$ occurred, $P(H_i|X,\xi_{X,\mu_j})$ are defined by $$P(\xi_{X,\mu_j} \mid X = X_n) = \frac{1}{\sum_{k=1}^{K} <X_n, \mu_k>} <X_n, \mu_j>$$

and $$P(H_i \mid X, \xi_{X,\mu_j}) = \frac{1}{\sum_{k=1}^{K} <Y_i, \mu_k>} <Y_i, \mu_j>$$

where

E denotes a probabilistic expectation measure, and <. > denotes an inner product, where the inner product represents a measure of similarity.

43. A system for generating three-dimensional models from uncalibrated views as set forth in claim 42, wherein in the means for outputting the overall three-dimensional model, the outputting device is selected from a group consisting of at least one of: a computer monitor, a video camera connected to a computer, and a computer readable media used to display the overall three-dimensional model of a portion of a scene, the computer readable media selected from a group consisting of an imaging Compact Disk (CD), a Digital Versatile Disk/Digital Video Disk (DVD), a floppy disk, a removable hard drive, a video cassette, and a solid-state recording media.

44. A system for generating three-dimensional models from uncalibrated views as set forth in claim 29, wherein the images from uncalibrated views are generated from a group consisting of: images generated by a single uncalibrated image capturing device viewing at least a portion of a scene at multiple pan and tilt settings; images captured with multiple uncalibrated image capturing devices viewing at least a portion of a scene; and images generated by multiple uncalibrated image capturing devices viewing at least a portion of a scene at multiple pan and tilt settings.

45. A system for generating three-dimensional models from uncalibrated views as set forth in claim 29, wherein a portion of a scene comprises at least one object, and wherein the images from uncalibrated views are formed from a group consisting of: images containing overlapping views of a portion of a scene, images containing partially overlapping views of a portion of a scene, images containing slightly overlapping views of a portion of a scene, and images containing non-overlapping views of a portion of a scene.

46. A system for generating three-dimensional models from uncalibrated views as set forth in claim 29, further comprising a means for identifying and eliminating unpaired features prior to computing correspondence between features and computing correspondence between sets of feature groupings.

47. A system for generating three-dimensional models from uncalibrated views as set forth in claim 29, wherein in the means for extracting features from the images, the features include at least one of: corner features, high entropy points, local edge features, and contour features.

48. A system for generating three-dimensional models from uncalibrated views as set forth in claim 29, wherein in the means for forming a three-dimensional structure from the uncalibrated image capturing device location, the three-dimensional structure is formed by a "structure from motion" algorithm, where motion from the uncalibrated image capturing device is computed from the correspondence established from the images of uncalibrated views captured at different pan-tilt settings of the uncalibrated image capturing device location, and where the "structure from motion" algorithm simulates a three-dimensional structure modeling at least a portion of a scene from the motion of the uncalibrated image capturing device.

49. A system for generating three-dimensional models from uncalibrated views as set forth in claim 29, wherein the correspondence between features and the correspondence between sets of feature groupings are computed by using a technique selected from a group consisting of: probabilistic matching, correlation measure, chi-square statistical measure, and dot product of feature vectors.

50. A system for generating three-dimensional models from uncalibrated views as set forth in claim 29, wherein the correspondence between features and the correspondence between sets of feature groupings are computed using a probabilistic matching method, where the probabilistic matching method computes probabilities of match between features by using prior information representing a portion of a scene, and where the probabilities of match between features correspond to a posteriori probabilities.

51. A system for generating three-dimensional models from uncalibrated views as set forth in claim 50, wherein in the means for identifying and eliminating unpaired features, two unpaired features are identified by computing and plotting an a posteriori probability relating both features, wherein the a posteriori probability relating both features has a flat profile when the two features are unpaired.

52. A system for generating three-dimensional models from uncalibrated views as set forth in claim 51, wherein the a posteriori probabilities are used to form a correspondence matrix, where a one-to-one correspondence between feature groupings from two uncalibrated image capturing device locations is established by maximizing the correspondence matrix.

53. A system for generating three-dimensional models from uncalibrated views as set forth in claim 50, wherein the a posteriori probability, $P(H_i|X)$, is defined by $$P(H_i \mid X) = \sum_{k=1}^{K} P(H_i \mid X, \xi_{X,\mu_k}) P(\xi_{X,\mu_j} \mid X = X_n)$$

where $X=[X_1, \ldots, X_N]$ and $Y=[Y_1, \ldots, Y_M]$ denote two sets of features extracted from two images from uncalibrated views; wherein a total of N features were extracted from an uncalibrated view, and a total of M features were extracted from another uncalibrated view;

$\mu = \mu_1, \ldots, \mu_K$ represent a set of features extracted from prior information, wherein a total of K features were extracted from prior information of the portion of the scene;

$H_i$ denotes a hypothesis that a feature $Y_i$ matches the set of features X, wherein i is a variable index with an integer value between 1 and M, and wherein i denotes an $i^{th}$ feature within the set of features Y;

$\xi_{X,\mu_j}$ denotes an event that {X matches $\mu_j$}, wherein j is a variable index with an integer value between 1 and K, and wherein j denotes a $j^{th}$ feature within the set of prior features $\mu$;

$P(\xi_{X,\mu_j}|X=X_n)$ denotes a probability of the set of features X matching a prior information feature $\mu_j$ given that the set of features X consists of a feature $X_n$, wherein n is a variable index with an integer value chosen between 1 and N, and wherein n denotes a $n^{th}$ feature within the set of features X;

$P(H_i|X,\xi_{X,\mu_j})$ denotes a probability of a feature $Y_i$ matching the set of features X given an event $\xi_{X,\mu_j}$ occurred (i.e. the set of features X matches the prior information feature $\mu_j$); wherein i denotes the $i^{th}$ feature within the set of features Y and j denotes the $j^{th}$ feature within the set of prior features $\mu$;

and wherein the probability of the set of features X matching the prior information feature $\mu_j$, $P(\xi_{X,\mu_j}|X=X_n)$, and the probability of a feature $Y_i$ matching the set of features X given an event $\xi_{X,\mu_j}$ occurred, $P(H_i|X,\xi_{X,\mu_j})$, are defined by $$P(\xi_{X,\mu_j} | X = X_n) = \frac{1}{\sum_{k=1}^{K} <X_n, \mu_k>} <X_n, \mu_j>$$

and $$P(H_i | X, \xi_{X,\mu_j}) = \frac{1}{\sum_{k=1}^{K} <Y_i, \mu_k>} <Y_i, \mu_j>$$

where

E denotes a probabilistic expectation measure, and <.> denotes an inner product, where the inner product represents a measure of similarity.

54. A system for generating three-dimensional models from uncalibrated views as set forth in claim 29, wherein a Sinkhorn normalization process is used to form the correspondence matrix.

55. A system for generating three-dimensional models from uncalibrated views as set forth in claim 29, wherein in the means for searching for the best matches, a Ransac robust estimation algorithm is used to find peaks on the correspondence matrix, wherein the peaks on the correspondence matrix indicate where the three-dimensional models from the uncalibrated image capturing device locations are to be stitched together.

56. A system for generating three-dimensional models from uncalibrated views as set forth in claim 29, wherein in the means for outputting the overall three-dimensional model, the outputting device is selected from a group consisting of at least one of: a computer monitor, a video camera connected to a computer, and a computer readable media used to display the overall three-dimensional model of a portion of a scene, the computer readable media selected from a group consisting of an imaging Compact Disk (CD), a Digital Versatile Disk/Digital Video Disk (DVD), a floppy disk, a removable hard drive, a video cassette, and a solid-state recording media.

57. A computer program product for generating three-dimensional models from uncalibrated views, the computer program product comprising means, stored on a computer readable medium for:

forming a three-dimensional model of at least a portion of a scene viewed from an uncalibrated image capturing device location by:
  receiving images from uncalibrated views of the uncalibrated image capturing device location;
  extracting features from the images from uncalibrated views of the uncalibrated image capturing device location;
  computing correspondence between features from images from the uncalibrated views captured from the uncalibrated image capturing device location;
  forming a three-dimensional structure modeling the at least a portion of a scene viewed from the uncalibrated image capturing device location;
iteratively performing the means for forming a three-dimensional model viewed from an uncalibrated image capturing device location, for a subset of the uncalibrated image capturing device locations available;
stitching together the three-dimensional models viewed from the subset of the uncalibrated image capturing device locations by:
  finding spatially local persistent feature groupings from the uncalibrated views captured at an uncalibrated image capturing device location;
  iteratively performing the means for finding spatially local persistent feature groupings for a subset of the uncalibrated image capturing device locations available;
  computing correspondence between sets of feature groupings from two uncalibrated image capturing device locations for a subset of pair-wise combinations of uncalibrated image capturing device locations;
  searching for best matches, whereby multiple three-dimensional models from a subset of uncalibrated image capturing device locations are thus "stitched" together to form an overall three-dimensional model of at least a portion of a scene; and
outputting the overall three-dimensional model of at least a portion of a scene.

58. A computer program product for generating three-dimensional models from uncalibrated views as set forth in claim 57, wherein in the means for receiving images from uncalibrated views, the images are obtained using at least one uncalibrated image capturing device selected from a group consisting of a still camera, a video camera, a Magnetic Resonance Imaging (MRI) recording mechanism, an ultrasound recording apparatus, an external computer connected to the system, an internet connection, an internet web camera, a direct satellite link, a video cassette recorder (VCR), a digital versatile disc (DVD) player, and imaging recording media used to gather snapshots of a desired portion of a scene at multiple uncalibrated views, the imaging recording media selected from a group consisting of a Compact Disk (CD), a Digital Versatile Disk/Digital Video Disk (DVD), a floppy disk, a magnetic tape, a removable hard drive, a printed picture, a scanned document, a faxed document, a digital camera, a video cassette, a Magnetic Resonance Imaging (MRI) recording media, an ultrasound recording media, and a solid-state recording media.

59. A computer program product for generating three-dimensional models from uncalibrated views as set forth in claim 58, wherein the images from uncalibrated views are generated from a group consisting of: images generated by a single uncalibrated image capturing device viewing at least a portion of a scene at multiple pan and tilt settings; images captured with multiple uncalibrated image capturing devices viewing at least a portion of a scene; and images generated by multiple uncalibrated image capturing devices viewing at least a portion of a scene at multiple pan and tilt settings.

60. A computer program product for generating three-dimensional models from uncalibrated views as set forth in claim 59, wherein a portion of a scene comprises at least one object, and wherein the images from uncalibrated views are formed from a group consisting of: images containing overlapping views of a portion of a scene, images containing partially overlapping views of a portion of a scene, images containing slightly overlapping views of a portion of a scene, and images containing non-overlapping views of a portion of a scene.

61. A computer program product for generating three-dimensional models from uncalibrated views as set forth in claim 60, further comprising a means for identifying and eliminating unpaired features prior to computing correspondence between features and computing correspondence between sets of feature groupings.

62. A computer program product for generating three-dimensional models from uncalibrated views as set forth in claim 61, wherein in the means for extracting features from the images, the features include at least one of: corner features, high entropy points, local edge features, and contour features.

63. A computer program product for generating three-dimensional models from uncalibrated views as set forth in claim 62, wherein the correspondence between features and the correspondence between sets of feature groupings are computed by using a technique selected from a group consisting of: probabilistic matching, correlation measure, chi-square statistical measure, and dot product of feature vectors.

64. A computer program product for generating three-dimensional models from uncalibrated views as set forth in claim 63, wherein in the means for forming a three-dimensional structure from the uncalibrated image capturing device location, the three-dimensional structure is formed by a "structure from motion" algorithm, where motion from the uncalibrated image capturing device is computed from the correspondence established from the images of uncalibrated views captured at different pan-tilt settings of the uncalibrated image capturing device location, and where the "structure from motion" algorithm simulates a three-dimensional structure modeling at least a portion of a scene from the motion of the uncalibrated image capturing device.

65. A computer program product for generating three-dimensional models from uncalibrated views as set forth in claim 64, wherein the correspondence between features and the correspondence between sets of feature groupings are computed using a probabilistic matching method, where the probabilistic matching method computes probabilities of match between features by using prior information representing a portion of a scene, and where the probabilities of match between features correspond to a posteriori probabilities.

66. A computer program product for generating three-dimensional models from uncalibrated views as set forth in claim 65, wherein in the means for identifying and eliminating unpaired features, two unpaired features are identified by computing and plotting an a posteriori probability relating both features, wherein the a posteriori probability relating both features has a flat profile when the two features are unpaired.

67. A computer program product for generating three-dimensional models from uncalibrated views as set forth in claim 66, wherein the a posteriori probabilities are used to form a correspondence matrix, where a one-to-one correspondence between feature groupings from two uncalibrated image capturing device locations is established by maximizing the correspondence matrix.

68. A computer program product for generating three-dimensional models from uncalibrated views as set forth in claim 67, wherein a Sinkhorn normalization process is used to form the correspondence matrix.

69. A computer program product for generating three-dimensional models from uncalibrated views as set forth in claim 68, wherein in the means for searching for the best matches, a Ransac robust estimation algorithm is used to find peaks on the correspondence matrix, wherein the peaks on the correspondence matrix indicate where the three-dimensional models from the uncalibrated image capturing device locations are to be stitched together.

70. A computer program product for generating three-dimensional models from uncalibrated views as set forth in claim 69, wherein the a posteriori probability, $P(H_i|X)$, is defined by $$P(H_i \mid X) = \sum_{k=1}^{K} P(H_i \mid X, \xi_{X,\mu_k}) P(\xi_{X,\mu_j} \mid X = X_n)$$

where
- $X=[X_1, \ldots, X_N]$ and $Y=[Y_1, \ldots, Y_M]$ denote two sets of features extracted from two images from uncalibrated views; wherein a total of N features were extracted from an uncalibrated view, and a total of M features were extracted from another uncalibrated view;
- $\mu=\mu_1, \ldots, \mu_K$ represent a set of features extracted from prior information, wherein a total of K features were extracted from prior information of the portion of the scene;
- $H_i$ denotes a hypothesis that a feature $Y_i$ matches the set of features X, wherein i is a variable index with an integer value between 1 and M, and wherein i denotes an $i^{th}$ feature within the set of features Y;
- $\xi_{X,\mu_j}$ denotes an event that $\{X \text{ matches } \mu_j\}$, wherein j is a variable index with an integer value between 1 and K, and wherein j denotes a $j^{th}$ feature within the set of prior features $\mu$;
- $P(\xi_{X,\mu_j}|X=X_n)$ denotes a probability of the set of features X matching a prior information feature $\mu_j$ given that the set of features X consists of a feature $X_n$, wherein n is a variable index with an integer value chosen between 1 and N, and wherein n denotes a $n^{th}$ feature within the set of features X;
- $P(H_i|X,\xi_{X,\mu_j})$ denotes a probability of a feature $Y_i$ matching the set of features X given an event $\xi_{X,\mu_j}$ occurred (i.e. the set of features X matches the prior information feature $\mu_j$); wherein i denotes the $i^{th}$ feature within the set of features Y and j denotes the $j^{th}$ feature within the set of prior features $\mu$;

and wherein the probability of the set of features X matching the prior information feature $\mu_j$, $P(\xi_{X,\mu_j}|X=X_n)$, and the probability of a feature $Y_i$ matching the set of features X given an event $\xi_{X,\mu_j}$ occurred, $P(H_i|X,\xi_{X,\mu_j})$, are defined by $$P(\xi_{X,\mu_j} | X = X_n) = \frac{1}{\sum_{k=1}^{K} <X_n, \mu_k>} <X_n, \mu_j>$$

and $$P(H_i | X, \xi_{X,\mu_j}) = \frac{1}{\sum_{k=1}^{K} <Y_i, \mu_k>} <Y_i, \mu_j>$$

where

E denotes a probabilistic expectation measure, and <.> denotes an inner product, where the inner product represents a measure of similarity.

71. A computer program product for generating three-dimensional models from uncalibrated views as set forth in claim 70, wherein in the means for receiving images from uncalibrated views, the images are obtained using at least one uncalibrated image capturing device selected from a group consisting of a still camera, a video camera, a Magnetic Resonance Imaging (MRI) recording mechanism, an ultrasound recording apparatus, an external computer connected to the system, an internet connection, an internet web camera, a direct satellite link, a video cassette recorder (VCR), a digital versatile disc (DVD) player, and imaging recording media used to gather snapshots of a desired portion of a scene at multiple uncalibrated views, the imaging recording media selected from a group consisting of a Compact Disk (CD), a Digital Versatile Disk/Digital Video Disk (DVD), a floppy disk, a magnetic tape, a removable hard drive, a printed picture, a scanned document, a faxed document, a digital camera, a video cassette, a Magnetic Resonance Imaging (MRI) recording media, an ultrasound recording media, and a solid-state recording media.

72. A computer program product for generating three-dimensional models from uncalibrated views as set forth in claim 57, wherein the images from uncalibrated views are generated from a group consisting of: images generated by a single uncalibrated image capturing device viewing at least a portion of a scene at multiple pan and tilt settings; images captured with multiple uncalibrated image capturing devices viewing at least a portion of a scene; and images generated by multiple uncalibrated image capturing devices viewing at least a portion of a scene at multiple pan and tilt settings.

73. A computer program product for generating three-dimensional models from uncalibrated views as set forth in claim 57, wherein a portion of a scene comprises at least one object, and wherein the images from uncalibrated views are formed from a group consisting of: images containing overlapping views of a portion of a scene, images containing partially overlapping views of a portion of a scene, images containing slightly overlapping views of a portion of a scene, and images containing non-overlapping views of a portion of a scene.

74. A computer program product for generating three-dimensional models from uncalibrated views as set forth in claim 57, further comprising a means for identifying and eliminating unpaired features prior to computing correspondence between features and computing correspondence between sets of feature groupings.

75. A computer program product for generating three-dimensional models from uncalibrated views as set forth in claim 57, wherein in the means for extracting features from the images, the features include at least one of: corner features, high entropy points, local edge features, and contour features.

76. A computer program product for generating three-dimensional models from uncalibrated views as set forth in claim 57, wherein in the means for forming a three-dimensional structure from the uncalibrated image capturing device location, the three-dimensional structure is formed by a "structure from motion" algorithm, where motion from the uncalibrated image capturing device is computed from the correspondence established from the images of uncalibrated views captured at different pan-tilt settings of the uncalibrated image capturing device location, and where the "structure from motion" algorithm simulates a three-dimensional structure modeling at least a portion of a scene from the motion of the uncalibrated image capturing device.

77. A computer program product for generating three-dimensional models from uncalibrated views as set forth in claim 57, wherein the correspondence between features and the correspondence between sets of feature groupings are computed by using a technique selected from a group consisting of: probabilistic matching, correlation measure, chi-square statistical measure, and dot product of feature vectors.

78. A computer program product for generating three-dimensional models from uncalibrated views as set forth in claim 57, wherein the correspondence between features and the correspondence between sets of feature groupings are computed using a probabilistic matching method, where the probabilistic matching method computes probabilities of match between features by using prior information representing a portion of a scene, and where the probabilities of match between features correspond to a posteriori probabilities.

79. A computer program product for generating three-dimensional models from uncalibrated views as set forth in claim 78, wherein in the means for identifying and eliminating unpaired features, two unpaired features are identified by computing and plotting an a posteriori probability relating both features, wherein the a posteriori probability relating both features has a flat profile when the two features are unpaired.

80. A computer program product for generating three-dimensional models from uncalibrated views as set forth in claim 79, wherein the a posteriori probabilities are used to form a correspondence matrix, where a one-to-one correspondence between feature groupings from two uncalibrated image capturing device locations is established by maximizing the correspondence matrix.

81. A computer program product for generating three-dimensional models from uncalibrated views as set forth in claim 78, wherein the a posteriori probability, $P(H_i|X)$, is defined by $$P(H_i | X) = \sum_{k=1}^{K} P(H_i | X, \xi_{X,\mu_k}) P(\xi_{X,\mu_j} | X = X_n)$$

where $X=[X_1, \ldots, X_N]$ and $Y=[Y_1, \ldots, Y_M]$ denote two sets of features extracted from two images from uncalibrated views; wherein a total of N features were extracted from an uncalibrated view, and a total of M features were extracted from another uncalibrated view;

$\mu = \mu_1, \ldots, \mu_K$ represent a set of features extracted from prior information, wherein a total of K features were extracted from prior information of the portion of the scene;

$H_i$ denotes a hypothesis that a feature $Y_i$ matches the set of features X, wherein i is a variable index with an integer value between 1 and M, and wherein i denotes an $i^{th}$ feature within the set of features Y;

$\xi_{X,\mu_j}$ denotes an event that $\{X$ matches $\mu_j\}$, wherein j is a variable index with an integer value between 1 and K, and wherein j denotes a $j^{th}$ feature within the set of prior features $\mu$;

$P(\xi_{X,\mu_j}|X=X_n)$ denotes a probability of the set of features X matching a prior information feature $\mu_j$ given that the set of features X consists of a feature $X_n$, wherein n is a variable index with an integer value chosen between 1 and N, and wherein n denotes a $n^{th}$ feature within the set of features X;

$P(H_i|X,\xi_{X,\mu_j})$ denotes a probability of a feature $Y_i$ matching the set of features X given an event $\xi_{X,\mu_j}$ occurred (i.e. the set of features X matches the prior information feature $\mu_j$); wherein i denotes the $i^{th}$ feature within the set of features Y and j denotes the $j^{th}$ feature within the set of prior features $\mu$;

and wherein the probability of the set of features X matching the prior information feature $\mu_j$, $P(\xi_{X,\mu_j}|X=X_n)$, and the probability of a feature $Y_i$ matching the set of features X given an event $\xi_{X,\mu_j}$ occurred, $P(H_i|X,\xi_{X,\mu_j})$, are defined by $$P(\xi_{X,\mu_j} | X = X_n) = \frac{1}{\sum_{k=1}^{K} <X_n, \mu_k>} <X_n, \mu_j>$$

and

-continued $$P(H_i | X, \xi_{X,\mu_j}) = \frac{1}{\sum_{k=1}^{K} <Y_i, \mu_k>} <Y_i, \mu_j>$$

where

E denotes a probabilistic expectation measure, and <.> denotes an inner product, where the inner product represents a measure of similarity.

82. A computer program product for generating three-dimensional models from uncalibrated views as set forth in claim 57, wherein a Sinkhorn normalization process is used to form the correspondence matrix.

83. A computer program product for generating three-dimensional models from uncalibrated views as set forth in claim 57, wherein in the means for searching for the best matches, a Ransac robust estimation algorithm is used to find peaks on the correspondence matrix, wherein the peaks on the correspondence matrix indicate where the three-dimensional models from the uncalibrated image capturing device locations are to be stitched together.

84. A computer program product for generating three-dimensional models from uncalibrated views as set forth in claim 57, wherein in the means for outputting the overall three-dimensional model, the outputting device is selected from a group consisting of at least one of: a computer monitor, a video camera connected to a computer, and a computer readable media used to display the overall three-dimensional model of a portion of a scene, the computer readable media selected from a group consisting of an imaging Compact Disk (CD), a Digital Versatile Disk/Digital Video Disk (DVD), a floppy disk, a removable hard drive, a video cassette, and a solid-state recording media.

* * * * *